(12) United States Patent
Elshafie et al.

(10) Patent No.: US 11,943,784 B2
(45) Date of Patent: Mar. 26, 2024

(54) REFERENCE SIGNAL FOR SKIPPED PDSCH

(71) Applicant: QUALCOMM Incorporated, San Diego, CA (US)

(72) Inventors: Ahmed Elshafie, San Diego, CA (US); Yi Huang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 259 days.

(21) Appl. No.: 17/449,792

(22) Filed: Oct. 1, 2021

(65) Prior Publication Data

US 2023/0107584 A1 Apr. 6, 2023

(51) Int. Cl.
*H04W 72/23* (2023.01)
*H04L 5/00* (2006.01)
*H04W 76/28* (2018.01)

(52) U.S. Cl.
CPC ........... *H04W 72/23* (2023.01); *H04L 5/0051* (2013.01); *H04W 76/28* (2018.02)

(58) Field of Classification Search
CPC .... H04L 5/0051; H04L 5/0044; H04W 72/23; H04W 76/28
USPC ........................................................ 370/329
See application file for complete search history.

(56) References Cited

U.S. PATENT DOCUMENTS

| | | | | |
|---|---|---|---|---|
| 2022/0094484 A1* | 3/2022 | Babaei | ................... | H04L 1/1822 |
| 2022/0182843 A1* | 6/2022 | Park | ..................... | H04L 25/0226 |
| 2023/0093477 A1* | 3/2023 | El Hamss | .............. | H04L 1/1861 |
| 2023/0112147 A1* | 4/2023 | Chien | ................... | H04L 1/1861 |
| | | | | 370/329 |

FOREIGN PATENT DOCUMENTS

WO WO-2022222144 A1 * 10/2022

OTHER PUBLICATIONS

CMCC: "Discussion on UE Feedback Enhancements for HARQ-ACK", R1-2101039, 3GPP TSG RAN WG1 #104-e, 3rd Generation Partnership Project (3GPP), Mobile Competence Centre, 650, Route Des Lucioles, F-06921 Sophia-Antipolis Cedex, France, vol. RAN WG1, No. e-Meeting, Jan. 25, 2021-Feb. 5, 2021, Jan. 18, 2021, XP051970618, 5 Pages, Sections 1-4.
International Search Report and Written Opinion—PCT/US2022/040358—ISA/EPO—dated Nov. 2, 2022.

(Continued)

*Primary Examiner* — Rownak Islam
(74) *Attorney, Agent, or Firm* — Procopio, Cory, Hargreaves & Savitch LLP

(57) ABSTRACT

A base station may configure a new demodulation reference signal (DM-RS) to indicate a skipped semi-persistent scheduled (SPS) physical downlink shared channel (PDSCH) occasion to a user equipment (UE), and the UE may detect a discontinuous transmission (DTX) in the skipped SPS PDSCH occasion based on receiving the new DM-RS within the corresponding PDSCH occasion. The UE may detect that the corresponding PDSCH occasion is a skipped SPS PDSCH occasion by measuring the energy of the PDSCH signal symbols to detect that the PDSCH signal symbols do not include data signal. The UE may measure the DM-RS energy or detect the configuration of the DM-RS to determine that the second PDSCH does not include a PDSCH signal.

30 Claims, 12 Drawing Sheets

(56) References Cited

OTHER PUBLICATIONS

VIVO: "HARQ-ACK Enhancements for Rel-17 URLLC" 3GPP Draft, 3GPP TSG RAN WG1#102-e, R1-2005374, 3rd Generation Partnership Project (3GPP), Mobile Competence Centre, 650, Route Des Lucioles, F-06921, Sophia-Antipolis Cedex, France, vol. RAN WG1, No. e-Meeting; Aug. 17, 2020-Aug. 28, 2020, Aug. 8, 2020 (Aug. 8, 2020), XP051917399, 2 pages, figures 1, 2 Section 2, section 2. 1. 1.

* cited by examiner

REFERENCE SIGNAL FOR SKIPPED PDSCH

TECHNICAL FIELD

The present disclosure relates generally to communication systems, and more particularly, to a method of wireless communication including a reference signal indicating a skipped physical downlink shared channel (PDSCH) instance.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may include a base station and a user equipment (UE). The base station may configure a new demodulation reference signal (DM-RS) to indicate a skipped semi-persistent scheduled (SPS) PDSCH occasion to the UE, and the UE may detect a discontinuous transmission (DTX) in the skipped SPS PDSCH occasion based on receiving the new DM-RS within the corresponding PDSCH occasion. The UE may detect that the corresponding PDSCH occasion is a skipped SPS PDSCH occasion by measuring the energy of the PDSCH signal symbols to detect that the PDSCH signal symbols do not include data signal. The UE may measure the DM-RS energy or detect the configuration of the DM-RS to determine that the second PDSCH does not include a PDSCH signal.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
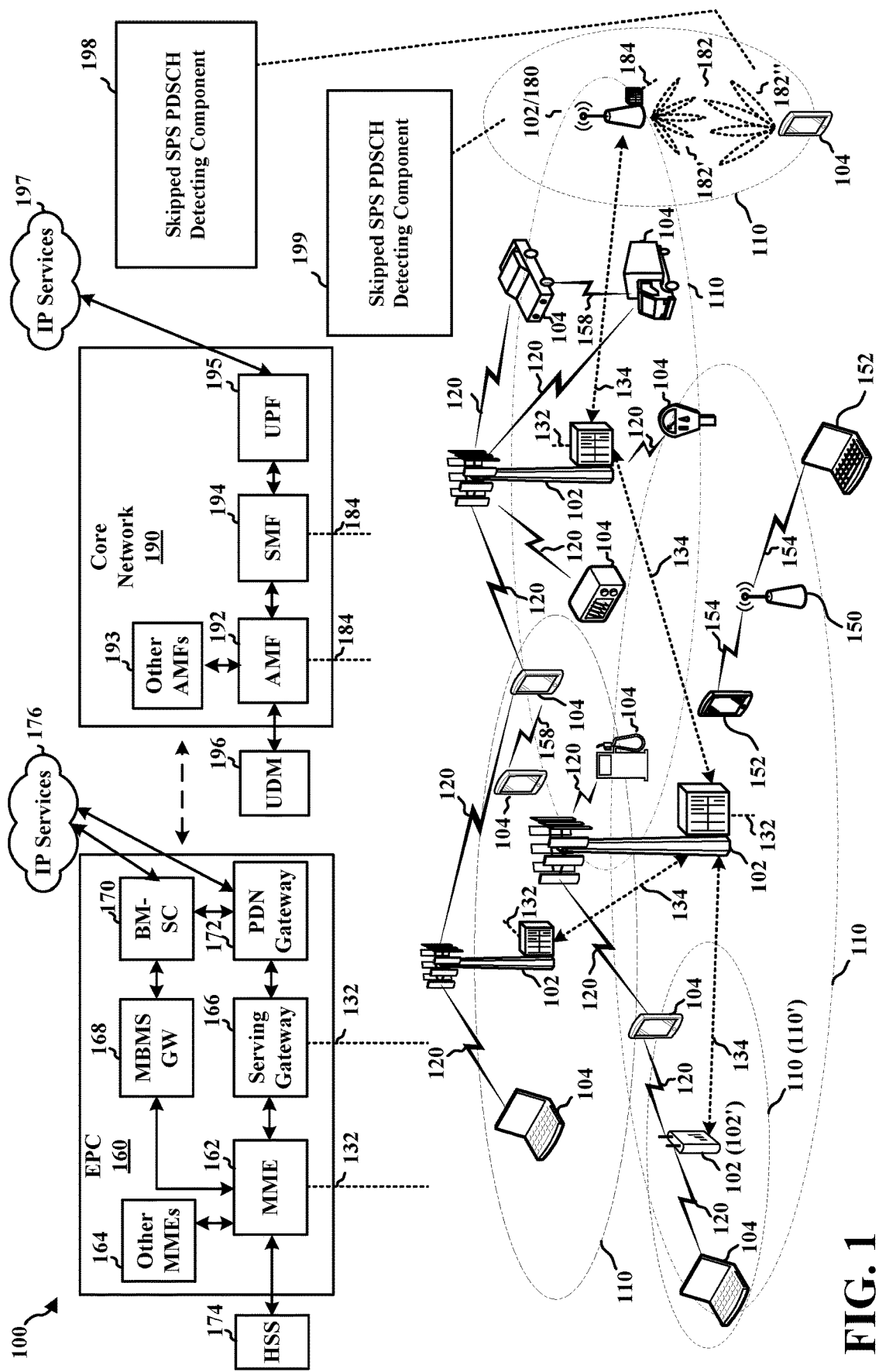
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL)

(also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR2-2, FR4, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include a skipped SPS PDSCH detecting component 198 configured to detect, from a base station, a first RS within a first PDSCH instance among a plurality of semi-persistent scheduled PDSCH occasions, and identify that no PDSCH signal is within the first PDSCH occasion from the base station based on the first RS within the first PDSCH occasion. In certain aspects, the base station 180 may include a skipped SPS PDSCH detecting component 199 configured to identify that no PDSCH signal is within a first PDSCH occasion among a plurality of semi-persistent scheduled PDSCH occasions transmitted to a UE, and transmit, to the UE, a first RS within the first PDSCH, the first RS indicating that no PDSCH signal is within the first PDSCH occasion. Although the following description may be focused on 5G NR, the concepts described herein may be applicable to other similar areas, such as LTE, LTE-A, CDMA, GSM, and other wireless technologies.

Figure 2:
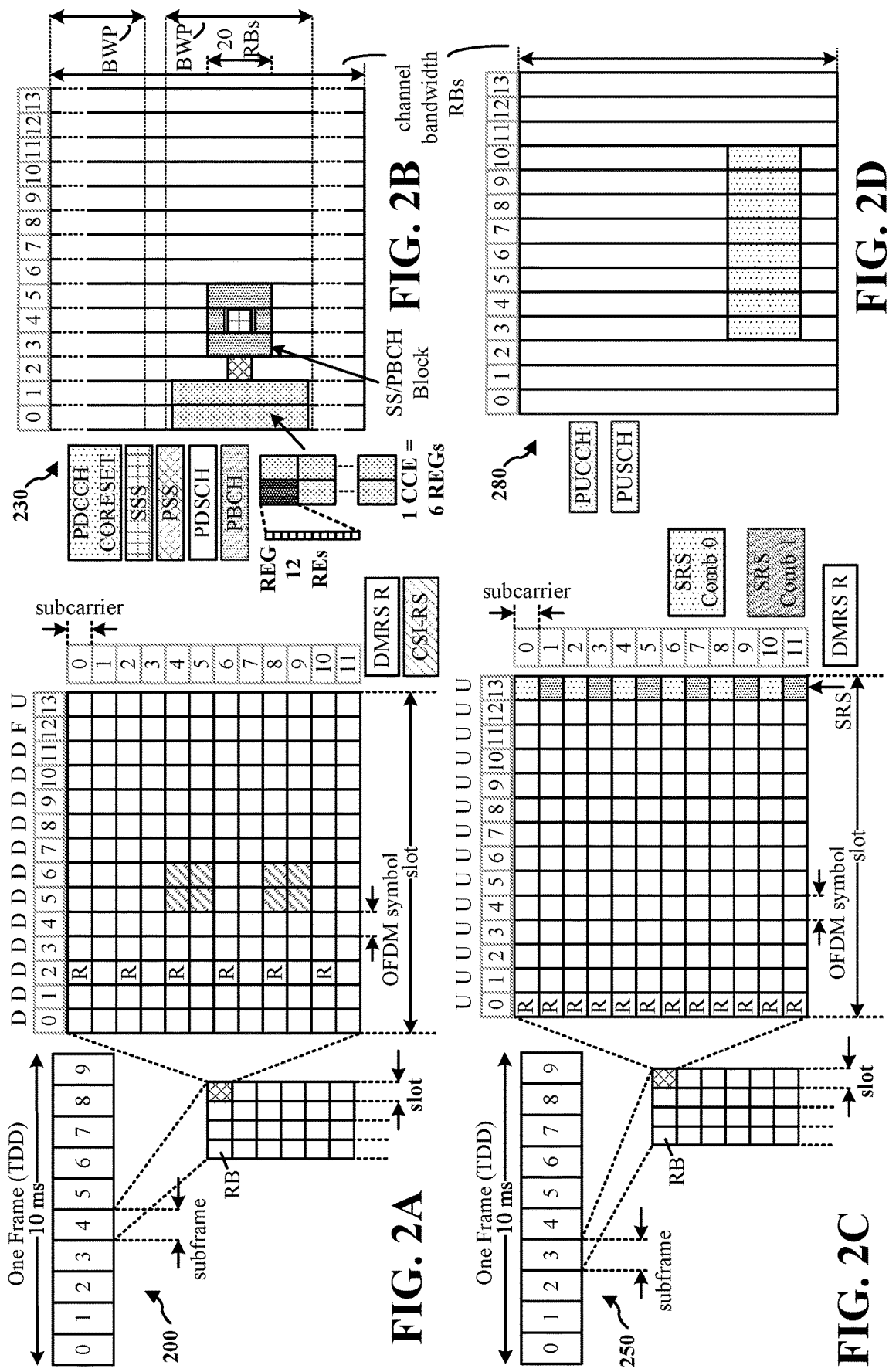
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| μ | SCS $\Delta f = 2^\mu \cdot 15$[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. The subcarrier spacing may be equal to $2^\mu *15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
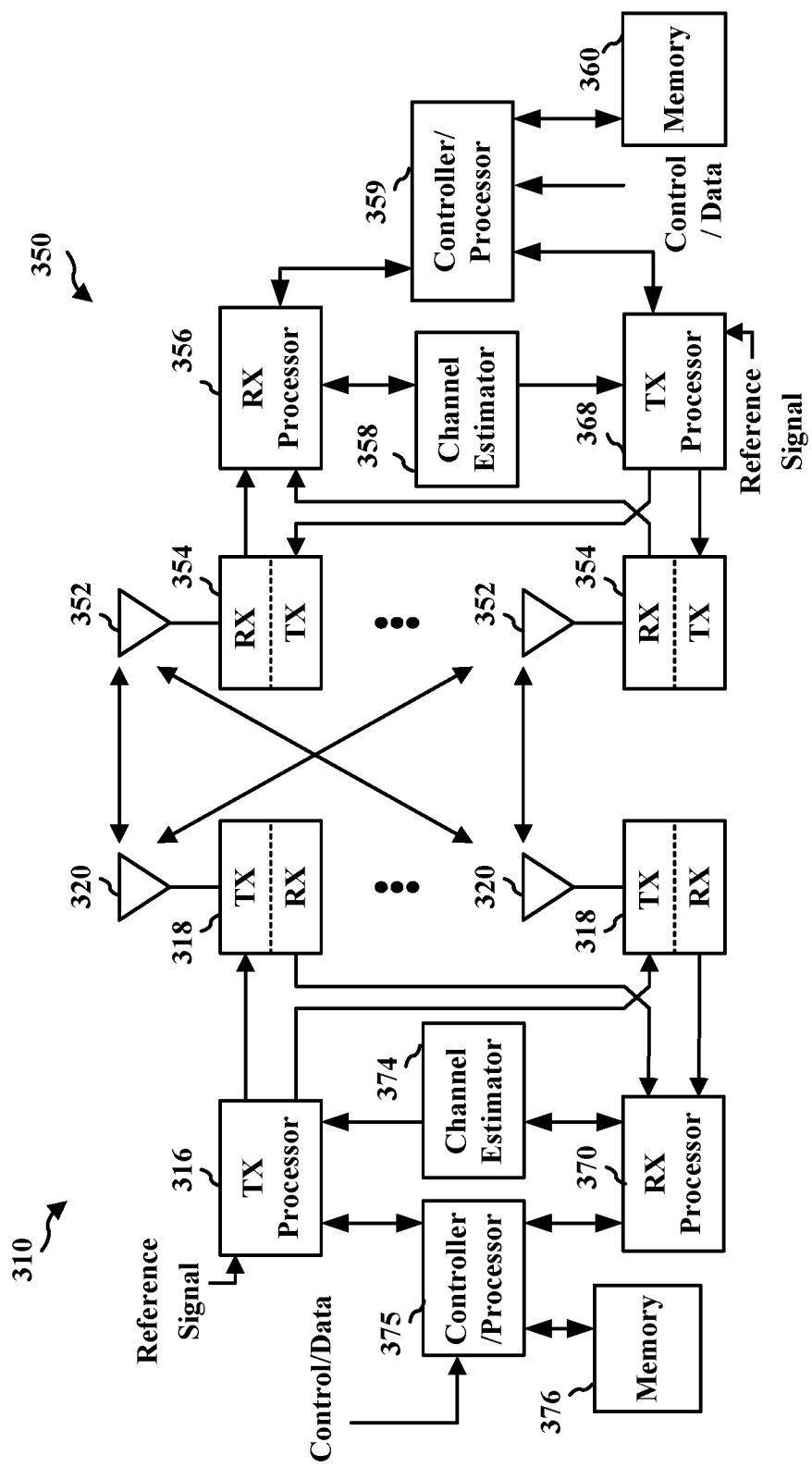
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1. At least one of the TX processor 316, the RX processor 370, and the controller/processor 375 may be configured to perform aspects in connection with 199 of FIG. 1.

Figure 4:
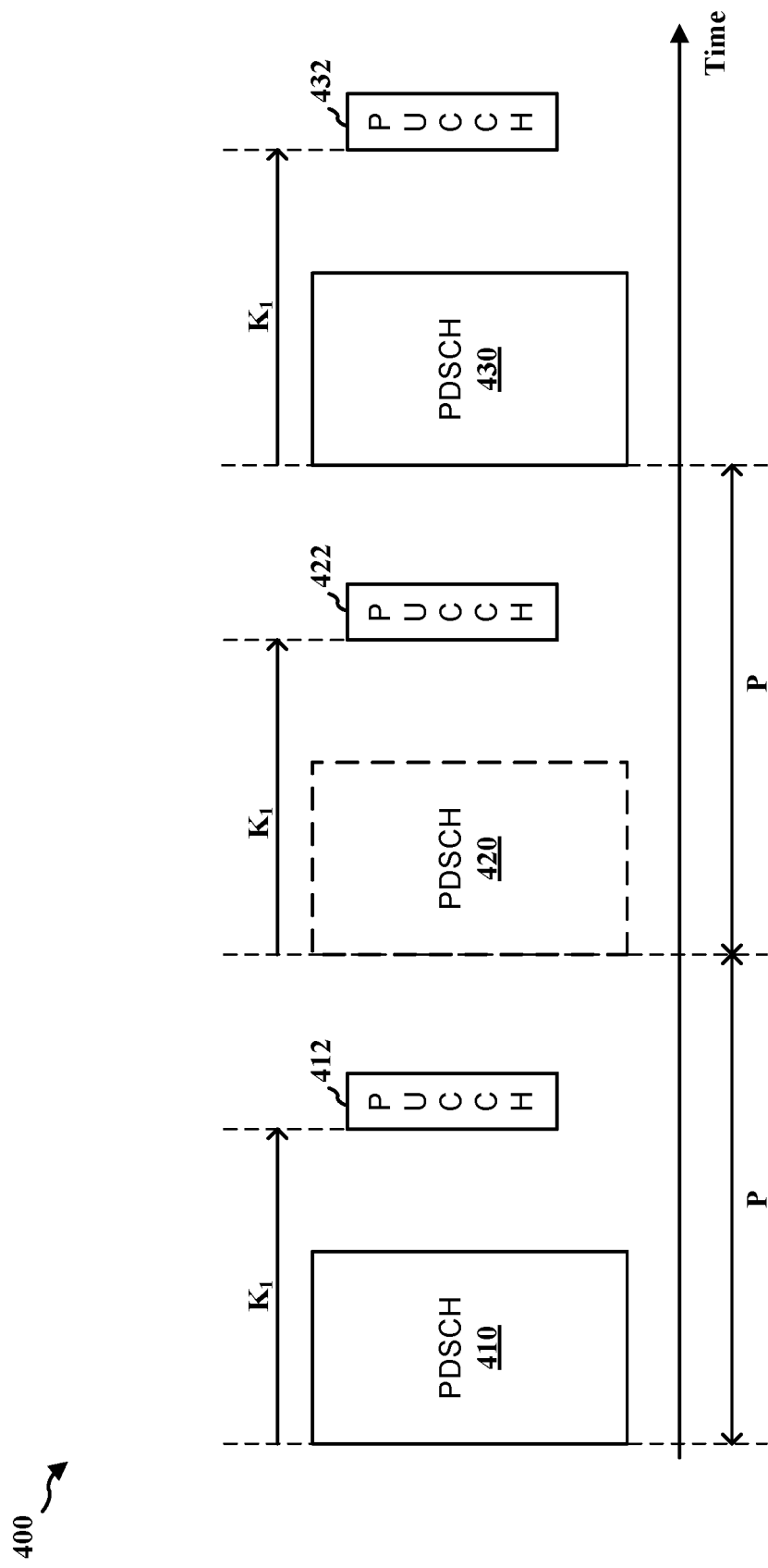
FIG. 4 illustrates semi-persistent scheduled (SPS) physical downlink shared channel (PDSCH) occasions of a method of wireless communication.

FIG. 4 illustrates diagram 400 including example SPS PDSCH occasions of a method of wireless communication. A base station may configure a UE with a semi-persistently scheduled (SPS) PDSCH occasion. That is, the base station may transmit to the UE a configuration of the SPS PDSCH occasions and semi-persistently transmit the PDSCH occasions to the UE based on the configuration of the SPS PDSCH occasions. The configuration of the SPS PDSCH occasions may include a periodicity of the SPS PDSCH and a parameter $K_1$ (or K1), where the parameter $K_1$ may refer to the time that the UE is configured to report the HARQ-ACK feedback of the PDSCH signal. For example, the UE may be configured with a first PDSCH 410, a second PDSCH 420, and a third PDSCH 430, with a periodicity P and the parameter $K_1$. Based on the parameter $K_1$, the UE may be configured to transmit the HARQ-ACK feedback via the PUCCH at a time $K_1$. For example, the UE may transmit the first PUCCH 412 to report the first HARQ-ACK feedback of the first PDSCH 410, transmit the second PUCCH 422 to report the second HARQ-ACK feedback of the second PDSCH 420, and transmit the third PUCCH 432 to report the third HARQ-ACK feedback of the third PDSCH 430. For example, the UE may determine that the second PDSCH 420 was not successfully received, and the UE may transmit a HARQ-ACK feedback indicating the NACK in the second PUCCH 422.

The UL transmission granted based on the parameter $K_1$ may collide with a DL transmission grant or another SPS PDSCH occasion. The UE may defer the HARQ-ACK feedback to the next available UL grant (e.g., PUCCH). That is, if the UE determines that the PUCCH granted based on the parameter $K_1$ collides with a DL transmission, the UE may determine to transmit the HARQ-ACK feedback in the next available UL, such as subsequently scheduled PUCCH. Accordingly, the HARQ-ACK feedback may be delayed and result in increased network latency in wireless communication.

In some cases, the SPS PDSCH may have an empty PDSCH signal. The base station may skip at least one of the SPS PDSCH occasions, and UE may not be able to determine if this occasion is skipped or not. That is, the base station may determine not to transmit the PDSCH signal in one of the SPS PDSCH occasions. However, the UE may not be able to determine if the base station did not transmit the PDSCH signal in the skipped SPS PDSCH occasion and may determine that the PDSCH signal was not successfully received in the skipped SPS PDSCH occasion. According, the UE may attempt to transmit the HARQ-ACK indicating NACK to the base station in response to the skipped SPS PDSCH occasion, while the HARQ-ACK indicating NACK of the skipped SPS PDSCH occasion may be a dummy NACK that is not expected by the base station and may reduce the available network resources.

Furthermore, the HARQ-ACK of the skipped SPS PDSCH occasion may collide with another DL transmission grant, and UE may determine to transmit the HARQ-ACK feedback in the next available UL, such as subsequently scheduled PUCCH. Accordingly, the HARQ-ACK feedback of the skipped SPS PDSCH occasion may increase the network latency in wireless communication and reduce the network resource.

In some aspects, at least one RS (e.g., a DM-RS) may be provided to improve the detection of the skipped SPS PDSCH occasions, which may have a lower cost than sending DCI because the UE may be configured to search for DCI that has no other use. That is, the base station may configure at least one RS to indicate that the corresponding SPS PDSCH occasion is skipped, and the UE may detect at least one RS to detect that the corresponding SPS PDSCH occasion is skipped and no PDSCH signal is transmitted within the skipped SPS PDSCH occasion.

By detecting that no PDSCH signal is transmitted within the skipped SPS PDSCH occasion, the UE may reduce the payload size in case of deferred HARQ-ACK since the dummy NACKs may be removed from the deferred HARQ-ACK. That is, the UE may detect that the base station skipped an SPS PDSCH occasion based on the at least one RS, and did not transmit a PDSCH signal within the skipped SPS PDSCH occasion, and determine to not report the HARQ-ACK for the skipped SPS PDSCH occasion. Accordingly, the UE may remove the dummy NACK, which may be sent when there is a skipped PDSCH because the UE understands that this SPS PDSCH occasion was skipped and no PDSCH signal was transmitted within the skipped SPS PDSCH occasion.

The UE may be configured to not decode a full PDSCH and save its computational power, as well as identify a timeline that can be easily met for other tasks. That is, the UE may detect that the base station skipped an SPS PDSCH occasion based on at least one RS, and the base station did not transmit a PDSCH signal within the skipped SPS PDSCH occasion, and further determine not to decode the skipped SPS PDSCH occasion. Accordingly, the UE may reserve its power by avoiding decoding the skipped SPS PDSCH occasion.

The UE may reduce transmission power waste because the UE may avoid deferring or transmitting a dummy NACK for the skipped SPS PDSCH occasion. That is, the UE may detect that the base station skipped an SPS PDSCH occasion based on at least one RS and did not transmit a PDSCH signal within the skipped SPS PDSCH occasion, and further determine not to report a HARQ-ACK for the skipped SPS PDSCH occasion. Accordingly, the UE may reserve its power by avoiding to transmit the dummy NACK for the skipped SPS PDSCH occasion.

The UE may reduce interference in the network resource since some UEs may not use the same resources, especially at deferred HARQ-ACK. That is, the UE may detect that the base station skipped an SPS PDSCH occasion based on at least one RS, based on the at least one RS, and did not transmit a PDSCH signal within the skipped SPS PDSCH occasion, and the UE may determine not to transmit the dummy NACK. Accordingly, the UE may reduce the payload size of deferred HARQ-ACK by not including the dummy NACK in the subsequent PUCCH occasion associated with the deferred HARQ-ACK.

The base station may improve the channel estimation at the UE, which will improve the decoding of the upcoming PDSCH signals. That is, at least one RS (e.g., DM-RS) may be used by the UE to estimate the channel and the UE may use the estimation of the DL channel to improve the decoding of the upcoming PDSCH signals. That is, the UE may use at least one RS indicating the skipped SPS PDSCH occasion to perform the channel estimation at the UE. For example, the UE may generate a channel state information (CSI) report or a channel quality indicator (CQI) report, and the UE may use the CSI report or the CQI report to improve the decoding of the subsequently received PDSCH occasions.

In one aspect, UE may also report the CQI, the CSI, or a signal-to-noise ratio (SNR) measured from the at least one RS (e.g., DM-RS) signal so that it could be used at the base station to perform certain configuration changes (e.g., change a modulation and coding scheme (MCS) or power levels) at the next data transmission. In another aspect, the UE may report nothing when at least one RS indicating the skipped SPS PDSCH occasion is observed.

A mode of operation may be agreed by the base station and UE through the RRC signal or the MAC-CE, where the PUCCH of an empty occasion may be skipped or used to report the CSI information. That is, the base station may configure how the UE may respond when the UE may detect that the base station skipped an SPS PDSCH occasion based on at least one RS. In one aspect, the UE may be configured to skip the corresponding PUCCH based on detecting that the base station skipped an SPS PDSCH occasion. In another aspect, the UE may be configured to transmit at least one channel report, e.g., the CQI report, the CSI report, or the SNR report, to the base station.

Figure 5:
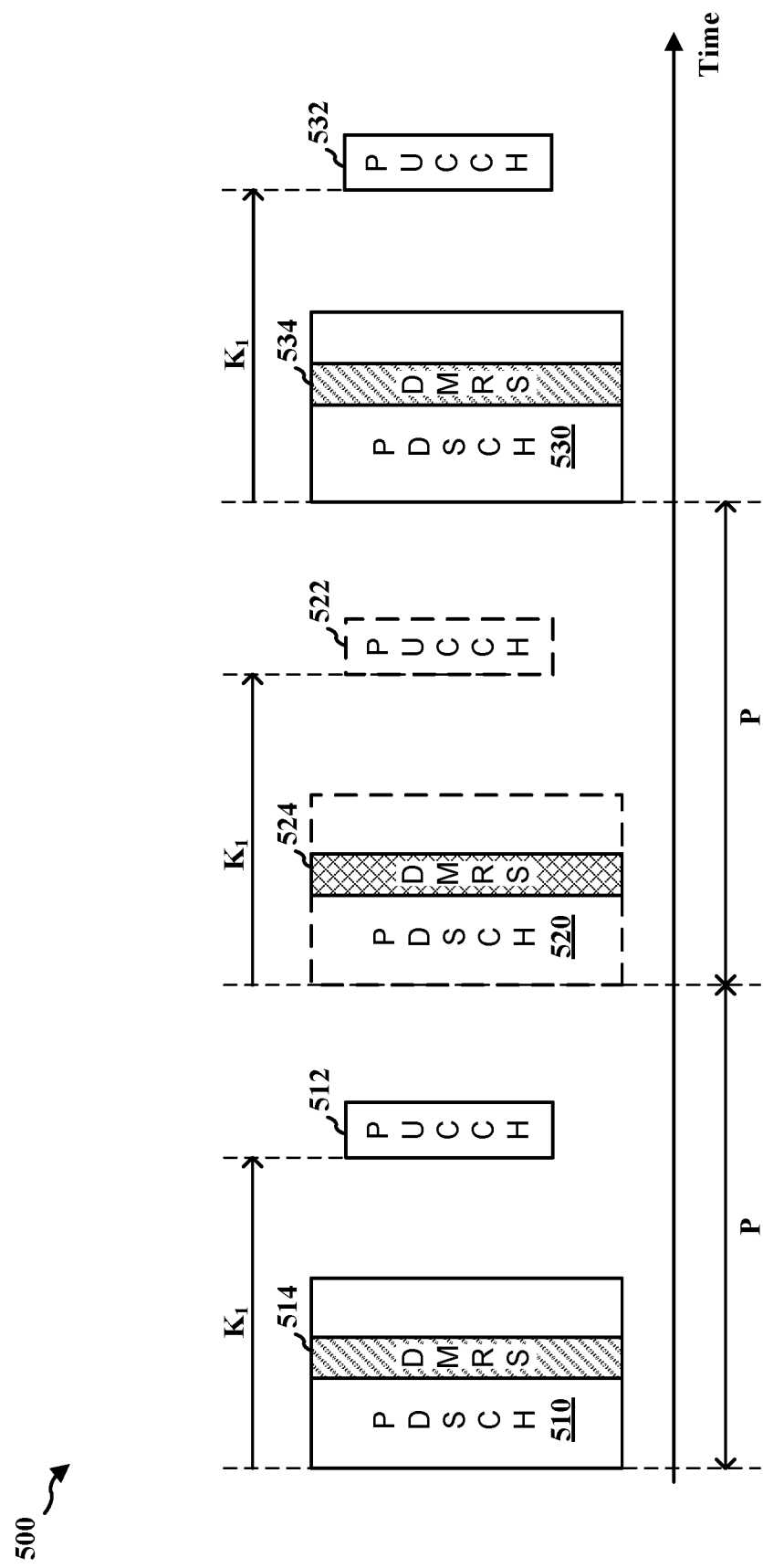
FIG. 5 illustrates SPS PDSCH occasions of a method of wireless communication.

FIG. 5 illustrates diagram 500 including example SPS PDSCH occasions of a method of wireless communication. A base station may configure a UE with a semi-persistently scheduled (SPS) PDSCH occasion. That is, the base station may transmit to the UE a configuration of the SPS PDSCH occasions and semi-persistently transmit the PDSCH occasions to the UE based on the configuration of the SPS PDSCH occasions. The configuration of the SPS PDSCH occasions may include a periodicity of the SPS PDSCH and a parameter $K_1$, where the parameter $K_1$ may refer to the time that configured for the UE to report the HARQ-ACK feedback of the PDSCH signal. For example, the UE may be configured with a first PDSCH 510, a second PDSCH 520, and a third PDSCH 530, with a periodicity P and the parameter $K_1$. Based on the parameter $K_1$, the UE may be configured to transmit the HARQ-ACK feedback via the PUCCH at a time $K_1$. For example, the UE may transmit the first PUCCH 512 to report the first HARQ-ACK feedback of the first PDSCH 510, transmit the second PUCCH 522 to report the second HARQ-ACK feedback of the second PDSCH 520, and transmit the third PUCCH 532 to report the third HARQ-ACK feedback of the third PDSCH 530. For example, the UE may determine that the second PDSCH 520 was not successfully received, and the UE may transmit a HARQ-ACK feedback indicating the NACK in the second PUCCH 522.

The first PDSCH 510 and the third PDSCH 530 may include a first DM-RS 514 and a third DM-RS 534. The first DM-RS 514 and the third DM-RS 534 may be referred to as nominal DM-RSs, which are configured for the UE to estimate the first PDSCH 510 and the third PDSCH 530.

To enhance the detection of the skipped PDSCH occasion and also improve channel estimation at the UE, the base station may transmit a DMRS-only signal in the skipped PDSCH SPS occasion. That is, the base station may determine to skip the second PDSCH 520 and may transmit a second DM-RS 524 to indicate that the second PDSCH 520 is a skipped SPS PDSCH occasion. The second DM-RS 524 may be referred to as a new DM-RS that may be distinguished from the nominal DM-RS, e.g., the first DM-RS 514 or the third DM-RS 534.

In one aspect, the UE may check or measure the energy of the data signal and the DM-RS signal to detect the presence of the PDSCH grant. That is, since the second PDSCH 520 carries the second DM-RS 524 but does not carry the PDSCH signal, UE may determine that the energy of the second DM-RS 524 may be significantly greater than the energy of the noise measured in the PDSCH occasion and detect that the second PDSCH occasion is a skipped SPS PDSCH occasion.

In another aspect, the DM-RS signal may help or support the UE in channel estimation and improve channel knowledge at the UE. Due to energy differences between the data symbols carrying noise and the DM-RS symbols, the UE may acquire a better estimation of the second PDSCH 520 carrying no PDSCH signal compared to the conventional way where the UE may collect noise-only samples and detect energy across all the empty data and DM-RS symbols.

Accordingly, with the presence of the DM-RS sequence, the UE may check the energy difference between the DM-RS symbol and that of the data symbol to declare a discontinuous transmission (DTX). That is, in the second PDSCH 520, the UE may check the energy difference between the empty data symbols of the second PDSCH 520 and the second DM-RS 524 to determine that the second PDSCH 520 is a skipped SPS PDSCH occasion that does not include the PDSCH signal and declare the DTX.

The base station may use the same pattern of DM-RS (e.g., the nominal DM-RS) with a different power-boosting or a new pattern that is agreed with the UE. That is, to distinguish the second DM-RS 524 with the first DM-RS 514 and the third DM-RS 534, the base station may configure the second DM-RS 524 to have at least one of a power level or a DM-RS pattern different from the nominal DM-RS. In one example, the base station may configure the second DM-RS 524 to have a different power-boosting to distinguish the second DM-RS 524 from the nominal DM-RS and help the UE to detect the energy difference between the second DM-RS 524 and the empty PDSCH symbols.

In some aspects, the base station may configure the second DM-RS 524 to have the new pattern be different from the nominal DM-RS. The pattern change may include a time location change of the DM-RS symbols, a change of the number of the DM-RS symbols, scrambling sequence change, etc. In one aspect, the second DM-RS 524 may be configured at different symbols in the time domain compared to the nominal DM-RS, and the UE may detect the DTX based on the second DM-RS 524 received at a symbol time different from the nominal DM-RS. In another aspect, the second DM-RS 524 may have a different number of symbols compared to the nominal DM-RS, and the UE may detect the DTX based on detecting that the second DM-RS 524 has a different number of symbols compared to the nominal DM-RS. For example, the second DM-RS 524 may be configured to have a reduced number of DM-RS symbols in the time domain compared to the nominal DM-RS, and the UE may detect the DTX based on detecting that the second DM-RS 524 has the reduced number of symbols compared to the nominal DM-RS. In another aspect, the second DM-RS 524 may be scrambled with a new sequence that is different from the nominal DM-RS, and the UE may detect the DTX based on detecting that the second DM-RS 524 has the new scramble sequence that is different from the nominal DM-RS.

In some aspects, the base station may configure the second DM-RS 524 to use a different comb pattern, e.g., comb offset or comb level, or use fewer DM-RS ports. In one aspect, the second DM-RS 524 may be configured to have a new comb pattern that is different from the nominal DM-RS, and the UE may detect the DTX based on detecting that the second DM-RS 524 has the new comb pattern. In one example, the second DM-RS 524 may have a higher comb offset in the frequency domain, and in another example, the second DM-RS 524 may have a higher comb level with a reduced number of DM-RS resources.

In another aspect, the base station may configure the second DM-RS 524 with a lower number of DM-RS ports than the nominal DM-RS. That is, the second DM-RS 524 may be configured with a lower number of DM-RS ports, and the UE may detect the DTX based on detecting that the second DM-RS 524 was received through the lower number of DM-RS ports.

In another aspect, the base station can use the same old pattern but with highly down-sampled or punctured DM-RS tones and a lower number of ports such that fewer RBs can have DM-RS tones. That is, the second DM-RS 524 may be generated by down-sampling or puncturing the DM-RS tones of the nominal DM-RS so that the second DM-RS 524 may have fewer RBs or fewer DM-RS tones. Accordingly, the base station may configure the second DM-RS 524 to have a reduced number of DM-RS symbols, DM-RS ports, or DM-RS RBs to carry DM-RS tones and conserve the transmission power consumption on the base station side.

In another aspect, the base station may boost the power of the new DM-RS signal to further enhance the detectability of the no-PDSCH occasions (grants). That is, the base station may boost the power of the second DM-RS 524 to have an increased power level compared to the nominal DM-RS. For example, the base station may boost the transmission power of the second DM-RS 524 to the power level equal to the combined transmission power of the PDSCH signal and the nominal DM-RS signal used for the PDSCH occasions carrying the PDSCH signal, e.g., the first PDSCH 510 or the third PDSCH 530. The boosted transmission power level may enhance the channel estimation at the UE side and help the UE to detect that the second PDSCH 520 occasion does not include a PDSCH signal.

In another aspect, the base station may flip the sign of every other element in the nominal DM-RS sequence. That is, the base station may generate the second DM-RS 524 by flipping one or more elements of the nominal DM-RS sequence of the nominal DM-RS. For example, the base station may generate the second DM-RS 524 by flipping every other element of the nominal DM-RS sequence of the nominal DM-RS. Accordingly, the new DM-RS sequence of the second DM-RS 524 may provide an indication to the UE that the second PDSCH 520 is the skipped SPS PDSCH occasion and that the current transmission has an empty PDSCH signal.

The base station may combine at least one of the above configurations for the second DM-RS 524 to indicate that the second PDSCH 520 is the skipped SPS PDSCH occasion that does not include a PDSCH signal. In one example, the base station may generate the second DM-RS 524 by picturing and flipping every other sequence of the DM-RS sequence of the nominal DM-RS and transmit using fewer ports to the UE. In another example, the base station may generate the second DM-RS 524 by flipping every other sequence of the DM-RS sequence of the nominal DM-RS and transmit using fewer ports to the UE by using a higher comb level.

The configuration of the second DM-RS 524 for the skipped SPS PDSCH occasion, including the change in pattern in comparison with the nominal DM-RS (e.g., the first DM-RS 514 or the third DM-RS 534), may be configured by the base station and signaled to UE through the RRC signal or the MAC-CE or activation/reactivation DCI in the SPS. In one aspect, the base station may send the configuration of the second DM-RS 524 to the UE through the RRC signal, the MAC-CE, or the DCI. In another aspect, the base station may transmit a set of configurations via the RRC signal, select one configuration or a subset of configurations among the set of configurations via the MAC-CE, or select one configuration among the set of configurations or the subset of configurations via the DCI. Furthermore, the RRC signal and the MAC-CE may configure a set of configurations for the UE, and the DCI configuring the SPS PDSCH grants may include activation or reactivation of the one configuration of the second DM-RS 524 among the set of configurations.

For compatibility with the old modes of operation, the base station may transmit signaling in the RRC signal, the MAC-CE, or the DCI (e.g., activation DCI or regular DCI), indicating whether to activate and transmit the new DM-RS to indicate the DTX and the skipped SPS PDSCH occasion, or deactivate the new DM-RS and not transmit any DM-RS in the empty or skipped PDSCH occasions.

The UE may receive the configuration of the second DM-RS 524 from the base station, and based on the pattern configuration change of the DM-RS symbols of the second DM-RS 524, the UE may detect that the second PDSCH 520 does not include PDSCH (DTX). The configuration of the second DM-RS 524 may increase the detectability of the DTX significantly for the UE, and the UE may detect the DTX with improved accuracy. The UE may detect that the second PDSCH 520 is a skipped SPS PDSCH occasion by first measuring the energy of the PDSCH signal symbols to detect that the PDSCH signal symbols do not include a data signal. The UE may measure the DM-RS energy or detect the configuration of the DM-RS to determine that the second PDSCH does not include a PDSCH signal.

Accordingly, the UE may determine not to transmit the HARQ-ACK feedback in the second PUCCH 522. Furthermore, if the second PUCCH 522 collides with other DL transmissions and the UE may defer the second PUCCH 522 to the next available UL grant, the UE may reduce the size of the deferred PUCCH transmission because the UE may not include a HARQ-ACK for the second PDSCH 520.

Figure 6:
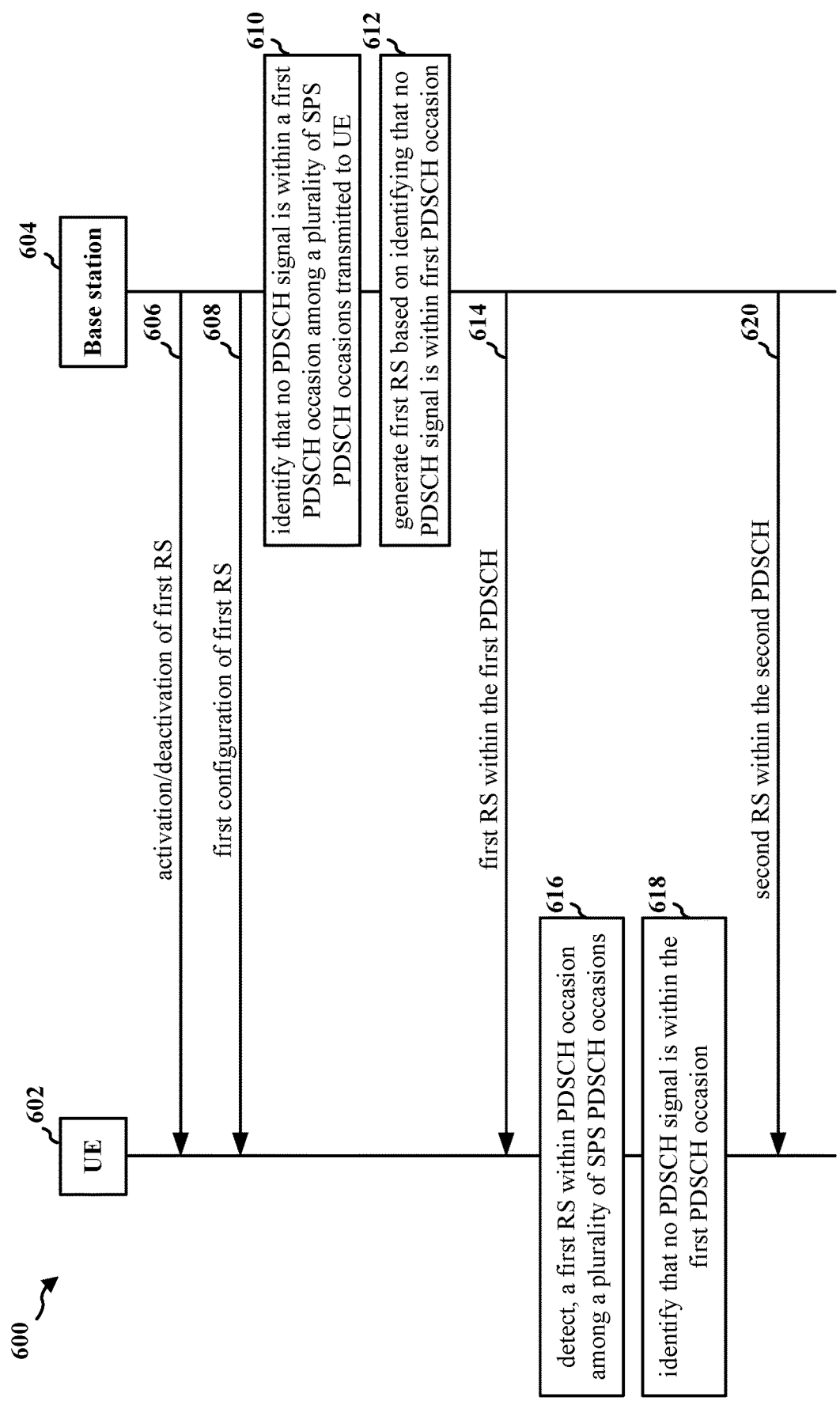
FIG. 6 is a call-flow diagram of a method of wireless communication.

FIG. 6 is a call-flow diagram 600 of a method of wireless communication. The call-flow diagram 600 may include a UE 602 and a base station 604. The base station 604 may configure a new RS (e.g., new DM-RS) to indicate a skipped SPS PDSCH occasion to the UE 602, and the UE 602 may detect DTX in the skipped SPS PDSCH occasion based on receiving the new DM-RS within the corresponding PDSCH occasion. The UE 602 may detect that the corresponding PDSCH occasion is a skipped SPS PDSCH occasion by first measuring the energy of the PDSCH signal symbols to detect that the PDSCH signal symbols do not include data signal. The UE 602 may measure the DM-RS energy or detect the configuration of the DM-RS to determine that the second PDSCH does not include a PDSCH signal.

At 606, the base station 604 may transmit an activation signal or a deactivation signal of the new RS, indicating that the corresponding PDSCH is the skipped SPS PDSCH occasion. The UE 602 may receive the activation signal or a deactivation signal of the new RS, indicating that the corresponding PDSCH is the skipped SPS PDSCH occasion. The activation/deactivation signal may be transmitted via at least one of an RRC signal, a MAC-CE, or DCI. Here, the new RS may include a DM-RS.

At 608, the base station 604 may transmit a configuration of the new RS to the UE 602, and the UE 602 may receive the configuration of the new RS from the base station 604. The base station 604 may generate the new RS based on the configuration of the new RS transmitted to the UE 602, and the UE 602 may detect the new RS based on the configuration of the new RS received from the base station 604. The configuration may be transmitted via at least one of the RRC signal, the MAC-CE, or the DCI. In one aspect, the base station 604 may send the configuration of the new RS to the UE 602 through the RRC signal, the MAC-CE, or the DCI. In another aspect, the base station 604 may transmit a set of configurations via the RRC signal, select one configuration or a subset of configurations among the set of configurations via the MAC-CE, or select one configuration among the set of configurations or the subset of configurations via the DCI. Furthermore, the RRC signal and the MAC-CE may configure a set of configurations for the UE 602, and the DCI configuring the SPS PDSCH grants may include activation or reactivation of the one configuration of the new RS among the set of configurations.

In one aspect, the configuration may include a first time location of the first RS, and at least one second configuration may include a second time location of the first RS, where the first time location of the first RS may be different from the second time location of the second RS.

In some aspects, the configuration may include an RS pattern indicating a set of RS resources allocated in a time-frequency domain, where a first RS pattern of the first RS is configured with a first number of RS resources and a second RS pattern of the second RS may be configured with a second number of RS resources, the first number of RS resources being smaller than the second number of RS resources. In one aspect, the first RS pattern may include a first comb pattern with a first comb offset in a frequency domain, and the second RS pattern may include a second comb pattern with a second comb offset in the frequency domain, where the first comb offset is greater than the second comb offset. In another aspect, the first RS pattern may include a first comb pattern with a first comb level, and the second RS pattern may include a second comb pattern with a second comb level, where the first comb level is greater than the second comb level.

In one aspect, the configuration may include a number of RS ports, where a first number of RS ports of the first RS may be configured to be different from a second number of RS ports of the second RS. In another aspect, the at least one first configuration may include a scrambling sequence of RS, where a first scrambling sequence of the first RS may be configured to be different from a second scrambling sequence of the second RS. The configuration may indicate that the first RS may be generated by down-sampling the second RS or puncturing a pattern of the second RS. In another aspect, the first RS may include a first transmission power boosted equal to a second transmission power of the second PDSCH occasion including the second RS and the PDSCH signal. In another aspect, a first sequence of the first RS may be generated by flipping one or more elements of a second sequence of the second RS.

At 610, the base station 604 may identify that no PDSCH signal is within a first PDSCH occasion among a plurality of semi-persistent scheduled PDSCH occasions transmitted to the UE 602. That is, the base station 604 may determine not to transmit the PDSCH signal in the first SPS PDSCH occasion.

At 612, the base station 604 may generate the first RS based on identifying that no PDSCH signal is within the first PDSCH occasion, where the first RS is generated based on the configuration of the new RS transmitted at 608. Here, the first RS may be a new RS indicating the skipped SPS PDSCH occasion. The first RS may include the DM-RS.

At 614, the base station 604 may transmit, to the UE 602, the first RS within the first PDSCH, the first RS indicating that no PDSCH signal is within the first PDSCH occasion. The UE 602 may receive, from the base station 604, the first PDSCH including the first RS, the first RS indicating that no PDSCH signal is within the first PDSCH occasion.

At 616, the UE 602 may detect the first RS within the first PDSCH instance among the plurality of semi-persistent scheduled PDSCH occasions. In one aspect, the UE 602 may detect the first RS based on the configuration of the first RS within the first PDSCH occasion received at 608.

At 618, the UE 602 may identify that no PDSCH signal is within the first PDSCH occasion from the base station 604 based on the first RS within the first PDSCH occasion. In one aspect, the UE 602 may identify that a PDSCH signal is not received within the first PDSCH occasion based on the configuration of the first RS within the first PDSCH occasion received at 608.

At 620, the base station 604 may transmit, to the UE 602, a second RS and a PDSCH signal within a second PDSCH occasion among the plurality of semi-persistent scheduled PDSCH occasions, the second RS indicating that the PDSCH signal is within the second PDSCH occasion. The UE 602 may receive, from the base station 604, the second RS and the PDSCH signal within the second PDSCH occasion among the plurality of semi-persistent scheduled PDSCH occasions, the second RS indicating that the PDSCH signal is within the second PDSCH occasion. In one aspect, at least one first configuration of the first RS may be different from at least one second configuration of the second RS.

Figure 7:
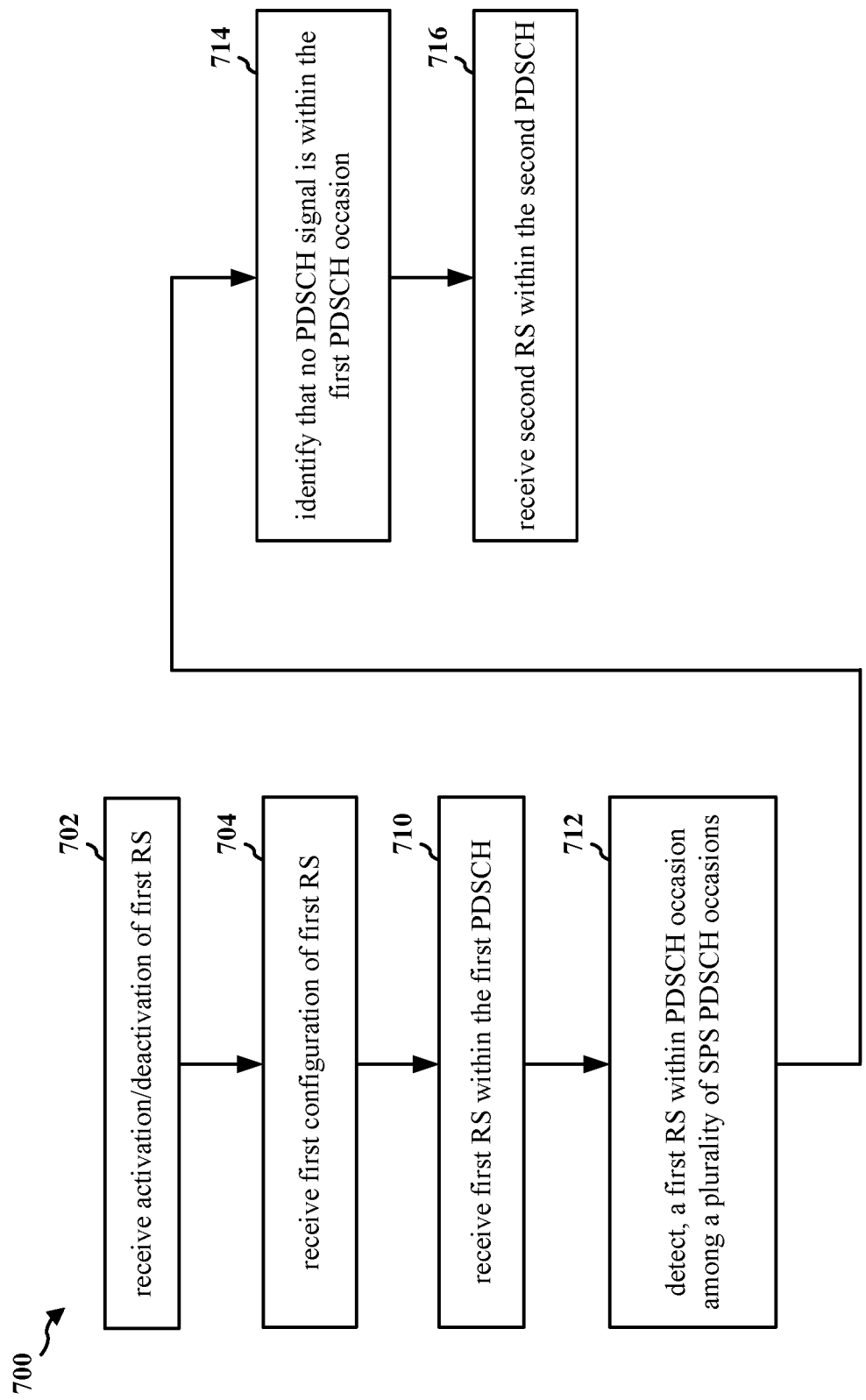
FIG. 7 is a flowchart of a method of wireless communication.

FIG. 7 is a flowchart 700 of a method of wireless communication. The method may be performed by a UE (e.g., the UE 104/602; the apparatus 1102). The UE may detect DTX in the skipped SPS PDSCH occasion based on receiving a new RS (e.g., new DM-RS) within the corresponding PDSCH occasion. The UE may detect that the corresponding PDSCH occasion is a skipped SPS PDSCH occasion by first measuring the energy of the PDSCH signal symbols to detect that the PDSCH signal symbols do not include data signal. The UE may measure the DM-RS energy or detect the configuration of the DM-RS to determine that the second PDSCH does not include a PDSCH signal.

At 702, the UE may receive the activation signal or a deactivation signal of the new RS indicating that the corresponding PDSCH is the skipped SPS PDSCH occasion. The activation/deactivation signal may be transmitted via at least one of an RRC signal, a MAC-CE, or DCI. Here, the new RS may include a DM-RS. For example, at 606, the UE 602 may receive the activation signal or a deactivation signal of the new RS indicating that the corresponding PDSCH is the skipped SPS PDSCH occasion. Furthermore, 702 may be performed by an RS component 1140.

At 704, the UE may receive the configuration of the new RS from the base station. The base station may generate the new RS based on the configuration of the new RS transmitted to the UE, and the UE may detect the new RS based on the configuration of the new RS received from the base station. The configuration may be transmitted via at least one of the RRC signal, the MAC-CE, or the DCI. In one aspect, the base station may send the configuration of the new RS to the UE through the RRC signal, the MAC-CE, or the DCI. In another aspect, the base station may transmit a set of configurations via the RRC signal, select one configuration or a subset of configurations among the set of configurations via the MAC-CE, or select one configuration among the set of configurations or the subset of configurations via the DCI. Furthermore, the RRC signal and the MAC-CE may configure a set of configurations for the UE, and the DCI configuring the SPS PDSCH grants may include activation or reactivation of the one configuration of the new RS among the set of configurations. For example, at 608, the UE 602 may receive the configuration of the new RS from the base station 604. Furthermore, 704 may be performed by the RS component 1140.

In one aspect, the configuration may include a first time location of the first RS and the at least one second configuration may include a second time location of the first RS, where the first time location of the first RS may be different from the second time location of the second RS.

In some aspects, the configuration may include an RS pattern indicating a set of RS resources allocated in a time-frequency domain, where a first RS pattern of the first RS is configured with a first number of RS resources and a second RS pattern of the second RS may be configured with a second number of RS resources, the first number of RS resources being smaller than the second number of RS resources. In one aspect, the first RS pattern may include a first comb pattern with a first comb offset in a frequency domain, and the second RS pattern may include a second comb pattern with a second comb offset in the frequency domain, where the first comb offset is greater than the second comb offset. In another aspect, the first RS pattern may include a first comb pattern with a first comb level, and the second RS pattern may include a second comb pattern with a second comb level, where the first comb level is greater than the second comb level.

In one aspect, the configuration may include a number of RS ports, where a first number of RS ports of the first RS may be configured to be different from a second number of RS ports of the second RS. In another aspect, the at least one first configuration may include a scrambling sequence of RS, where a first scrambling sequence of the first RS may be configured to be different from a second scrambling sequence of the second RS. The configuration may indicate that the first RS may be generated by down-sampling the second RS or puncturing a pattern of the second RS. In another aspect, the first RS may include a first transmission power boosted equal to a second transmission power of the second PDSCH occasion including the second RS and the PDSCH signal. In another aspect, a first sequence of the first RS may be generated by flipping one or more elements of a second sequence of the second RS.

At 710, the UE may receive, from the base station, the first PDSCH including the first RS, the first RS indicating that no PDSCH signal is within the first PDSCH occasion. For example, at 614, the UE 602 may receive, from the base station 604, the first PDSCH including the first RS, the first RS indicating that no PDSCH signal is within the first PDSCH occasion. Furthermore, 710 may be performed by the RS component 1140 and an SPS PDSCH component 1142.

At 712, the UE may detect the first RS within the first PDSCH instance among the plurality of semi-persistent scheduled PDSCH occasions. In one aspect, the UE may detect the first RS based on the configuration of the first RS within the first PDSCH occasion received at 704. For example, at 616, the UE 602 may detect the first RS within the first PDSCH instance among the plurality of semi-persistent scheduled PDSCH occasions. Furthermore, 712 may be performed by the RS component 1140.

At 714, the UE may identify that no PDSCH signal is within the first PDSCH occasion from the base station based on the first RS within the first PDSCH occasion. In one aspect, the UE may identify that a PDSCH signal is not received within the first PDSCH occasion based on the configuration of the first RS within the first PDSCH occasion received at 704. For example, at 618, the UE 602 may identify that no PDSCH signal is within the first PDSCH occasion from the base station 604 based on the first RS within the first PDSCH occasion. Furthermore, 714 may be performed by the SPS PDSCH component 1142.

At 716, the UE may receive, from the base station, the second RS and the PDSCH signal within the second PDSCH occasion among the plurality of semi-persistent scheduled PDSCH occasions, the second RS indicating that the PDSCH signal is within the second PDSCH occasion. In one aspect, at least one first configuration of the first RS may be different from at least one second configuration of the second RS. For example, at 620, the UE 602 may receive, from the base station 604, the second RS and the PDSCH signal within the second PDSCH occasion among the plurality of semi-persistent scheduled PDSCH occasions, the second RS indicating that the PDSCH signal is within the second PDSCH occasion. Furthermore, 716 may be performed by the RS component 1140 and the SPS PDSCH component 1142.

Figure 8:
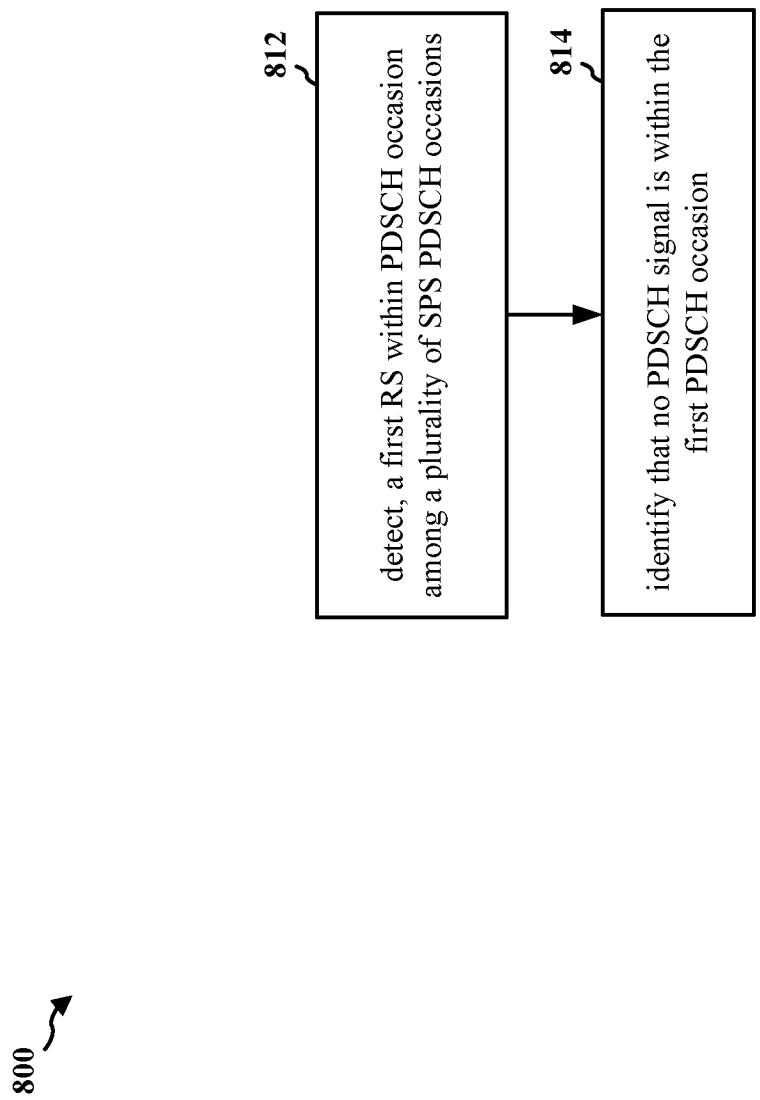
FIG. 8 is a flowchart of a method of wireless communication.

FIG. 8 is a flowchart 800 of a method of wireless communication. The method may be performed by a UE (e.g., the UE 104/602; the apparatus 1102). The UE may detect DTX in the skipped SPS PDSCH occasion based on receiving a new RS (e.g., new DM-RS) within the corresponding PDSCH occasion. The UE may detect that the corresponding PDSCH occasion is a skipped SPS PDSCH occasion by first measuring the energy of the PDSCH signal symbols to detect that the PDSCH signal symbols do not include data signal. The UE may measure the DM-RS energy or detect the configuration of the DM-RS to determine that the second PDSCH does not include a PDSCH signal.

At 812, the UE may detect the first RS within the first PDSCH instance among the plurality of semi-persistent scheduled PDSCH occasions. In one aspect, the UE may detect the first RS based on the configuration of the first RS within the first PDSCH occasion received at 804. For example, at 616, the UE 602 may detect the first RS within the first PDSCH instance among the plurality of semi-persistent scheduled PDSCH occasions. Furthermore, 812 may be performed by the RS component 1140.

At 814, the UE may identify that no PDSCH signal is within the first PDSCH occasion from the base station based on the first RS within the first PDSCH occasion. In one aspect, the UE may identify that a PDSCH signal is not received within the first PDSCH occasion based on the configuration of the first RS within the first PDSCH occasion received at 804. For example, at 618, the UE 602 may identify that no PDSCH signal is within the first PDSCH occasion from the base station 604 based on the first RS within the first PDSCH occasion. Furthermore, 814 may be performed by the SPS PDSCH component 1142.

Figure 9:
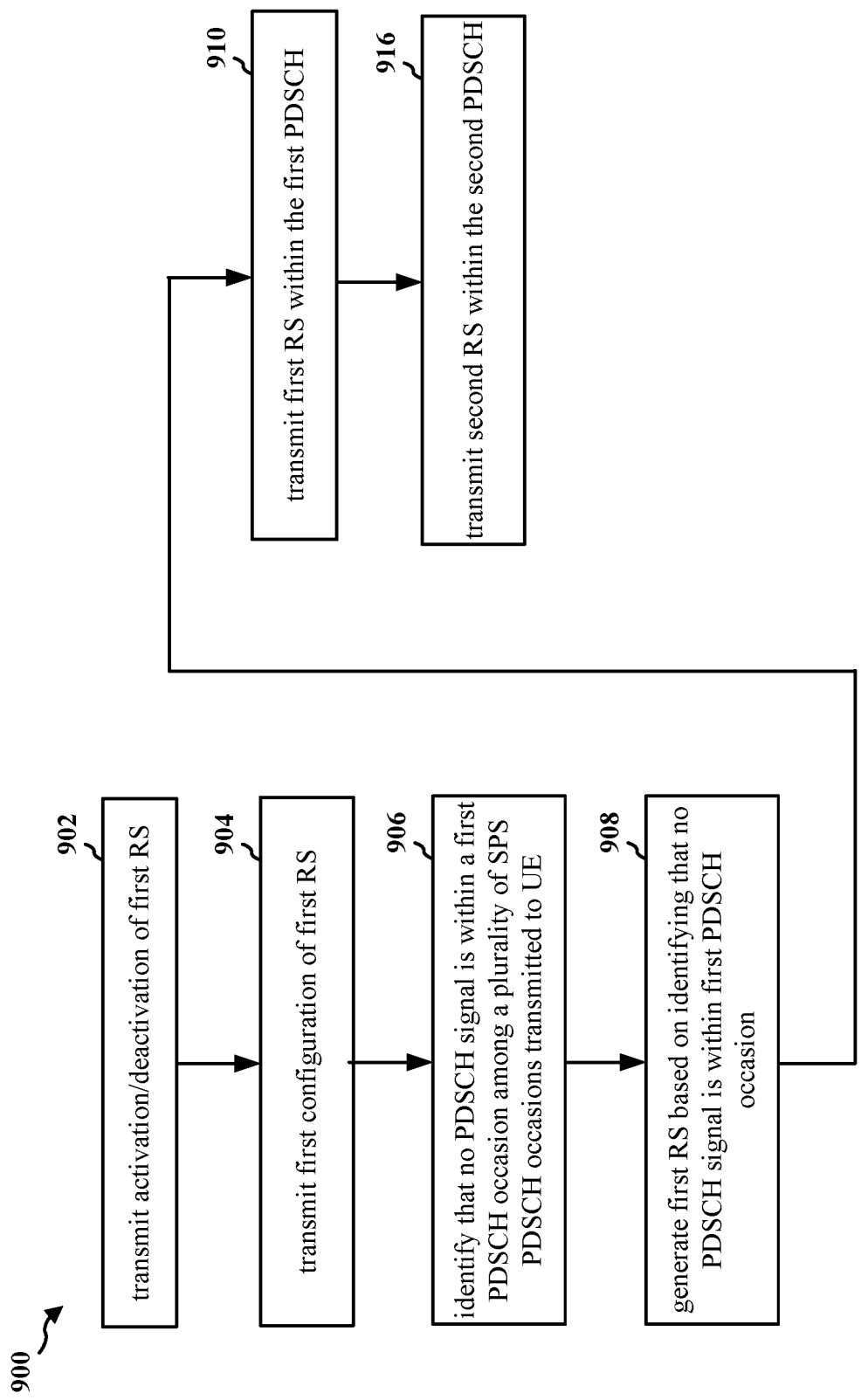
FIG. 9 is a flowchart of a method of wireless communication.

FIG. 9 is a flowchart 900 of a method of wireless communication. The method may be performed by a base station (e.g., the base station 102/180/604; the apparatus 1202). The base station may configure a new RS (e.g., new DM-RS) to indicate a skipped SPS PDSCH occasion to the UE for the UE to detect DTX in the skipped SPS PDSCH occasion based on receiving the new DM-RS within the corresponding PDSCH occasion.

At 902, the base station may transmit an activation signal or a deactivation signal of the new RS indicating that the corresponding PDSCH is the skipped SPS PDSCH occasion. The activation/deactivation signal may be transmitted via at least one of an RRC signal, a MAC-CE, or DCI. Here, the new RS may include a DM-RS. For example, at 606, the base station 604 may transmit an activation signal or a deactivation signal of the new RS indicating that the corresponding PDSCH is the skipped SPS PDSCH occasion. Furthermore, 902 may be performed by an RS component 1240.

At 904, the base station may transmit a configuration of the new RS to the UE. The base station may generate the new RS based on the configuration of the new RS transmitted to the UE, and the UE may detect the new RS based on the configuration of the new RS received from the base station. The configuration may be transmitted via at least one of the RRC signal, the MAC-CE, or the DCI. In one aspect, the base station may send the configuration of the new RS to the UE through the RRC signal, the MAC-CE, or the DCI. In another aspect, the base station may transmit a set of configurations via the RRC signal, select one configuration or a subset of configurations among the set of configurations via the MAC-CE, or select one configuration among the set of configurations or the subset of configurations via the DCI. Furthermore, the RRC signal and the MAC-CE may configure a set of configurations for the UE, and the DCI configuring the SPS PDSCH grants may include activation or reactivation of the one configuration of the new RS among the set of configurations. For example, at 608, the base station 604 may transmit a configuration of the new RS to the UE 602. Furthermore, 904 may be performed by the RS component 1240.

In one aspect, the configuration may include a first time location of the first RS and the at least one second configuration may include a second time location of the first RS, where the first time location of the first RS may be different from the second time location of the second RS.

In some aspects, the configuration may include an RS pattern indicating a set of RS resources allocated in a time-frequency domain, where a first RS pattern of the first RS is configured with a first number of RS resources and a second RS pattern of the second RS may be configured with a second number of RS resources, the first number of RS resources being smaller than the second number of RS resources. In one aspect, the first RS pattern may include a first comb pattern with a first comb offset in a frequency domain, and the second RS pattern may include a second comb pattern with a second comb offset in the frequency domain, where the first comb offset is greater than the second comb offset. In another aspect, the first RS pattern may include a first comb pattern with a first comb level, and the second RS pattern may include a second comb pattern with a second comb level, where the first comb level is greater than the second comb level.

In one aspect, the configuration may include a number of RS ports, where a first number of RS ports of the first RS may be configured to be different from a second number of RS ports of the second RS. In another aspect, the at least one first configuration may include a scrambling sequence of RS, where a first scrambling sequence of the first RS may be configured to be different from a second scrambling sequence of the second RS. The configuration may indicate that the first RS may be generated by down-sampling the second RS or puncturing a pattern of the second RS. In another aspect, the first RS may include a first transmission power boosted equal to a second transmission power of the second PDSCH occasion including the second RS and the PDSCH signal. In another aspect, a first sequence of the first RS may be generated by flipping one or more elements of a second sequence of the second RS.

At 906, the base station may identify that no PDSCH signal is within a first PDSCH occasion among a plurality of semi-persistent scheduled PDSCH occasions transmitted to the UE. That is, the base station may determine not to transmit the PDSCH signal in the first SPS PDSCH occasion. For example, at 610, the base station 604 may identify that no PDSCH signal is within a first PDSCH occasion among a plurality of semi-persistent scheduled PDSCH occasions transmitted to the UE 602. Furthermore, 906 may be performed by an SPS PDSCH component 1242.

At 908, the base station may generate the first RS based on identifying that no PDSCH signal is within the first PDSCH occasion, where the first RS is generated based on the configuration of the new RS transmitted at 904. Here, the first RS may be a new RS indicating the skipped SPS PDSCH occasion. The first RS may include the DM-RS. For example, at 612, the base station 604 may generate the first RS based on identifying that no PDSCH signal is within the first PDSCH occasion, where the first RS is generated based on the configuration of the new RS. Furthermore, 908 may be performed by the RS component 1240.

At 910, the base station may transmit, to the UE, the first RS within the first PDSCH, the first RS indicating that no PDSCH signal is within the first PDSCH occasion. For example, at 614, the base station 604 may transmit, to the UE 602, the first RS within the first PDSCH, the first RS indicating that no PDSCH signal is within the first PDSCH occasion. Furthermore, 910 may be performed by the RS component 1240 and the SPS PDSCH component 1242.

At 916, the base station may transmit, to the UE, a second RS and a PDSCH signal within a second PDSCH occasion among the plurality of semi-persistent scheduled PDSCH occasions, the second RS indicating that the PDSCH signal is within the second PDSCH occasion. In one aspect, at least one first configuration of the first RS may be different from at least one second configuration of the second RS. For example, at 620, the base station 604 may transmit, to the UE 602, a second RS and a PDSCH signal within a second PDSCH occasion among the plurality of semi-persistent scheduled PDSCH occasions, the second RS indicating that the PDSCH signal is within the second PDSCH occasion. Furthermore, 916 may be performed by the RS component 1240 and the SPS PDSCH component 1242.

Figure 10:
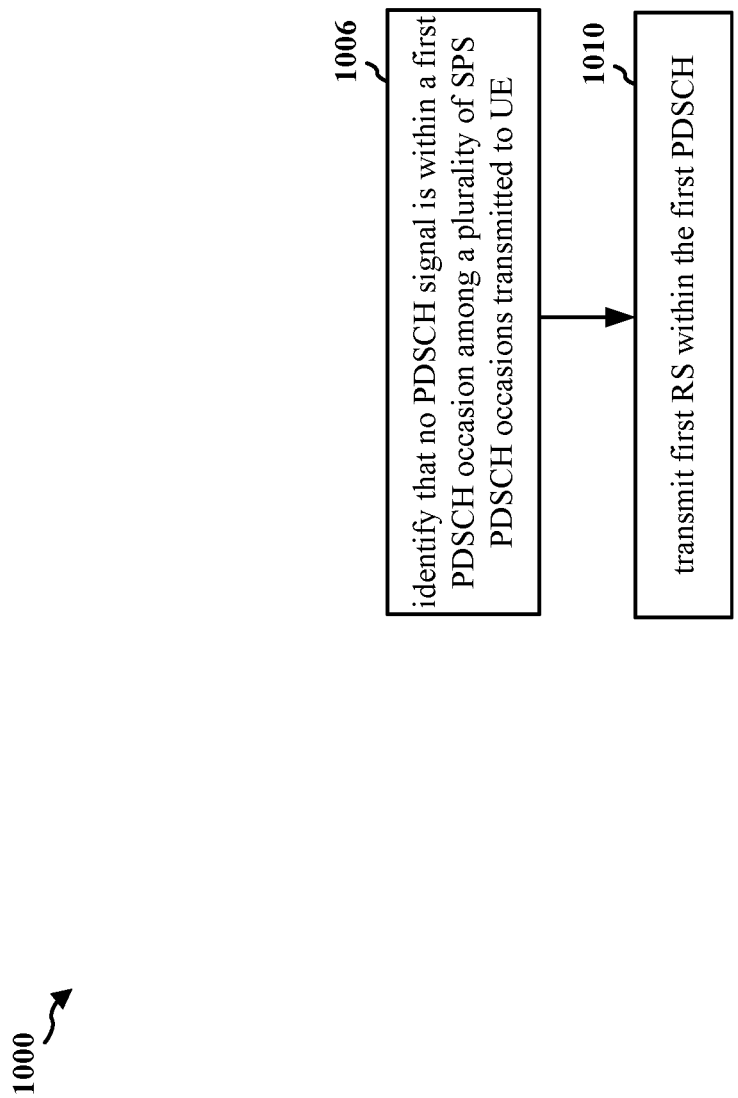
FIG. 10 is a flowchart of a method of wireless communication.

FIG. 10 is a flowchart 1000 of a method of wireless communication. The method may be performed by a UE (e.g., the UE 104/602; the apparatus 1102). The base station may configure a new RS (e.g., new DM-RS) to indicate a skipped SPS PDSCH occasion to the UE for the UE to detect DTX in the skipped SPS PDSCH occasion based on receiving the new DM-RS within the corresponding PDSCH occasion.

At 1006, the base station may identify that no PDSCH signal is within a first PDSCH occasion among a plurality of semi-persistent scheduled PDSCH occasions transmitted to the UE. That is, the base station may determine not to transmit the PDSCH signal in the first SPS PDSCH occasion. For example, at 610, the base station 604 may identify that no PDSCH signal is within a first PDSCH occasion among a plurality of semi-persistent scheduled PDSCH occasions transmitted to the UE 602. Furthermore, 1006 may be performed by an SPS PDSCH component 1242.

At 1010, the base station may transmit, to the UE, the first RS within the first PDSCH, the first RS indicating that no PDSCH signal is within the first PDSCH occasion. For example, at 614, the base station 604 may transmit, to the UE 602, the first RS within the first PDSCH, the first RS indicating that no PDSCH signal is within the first PDSCH occasion. Furthermore, 1010 may be performed by the RS component 1240 and the SPS PDSCH component 1242.

Figure 11:
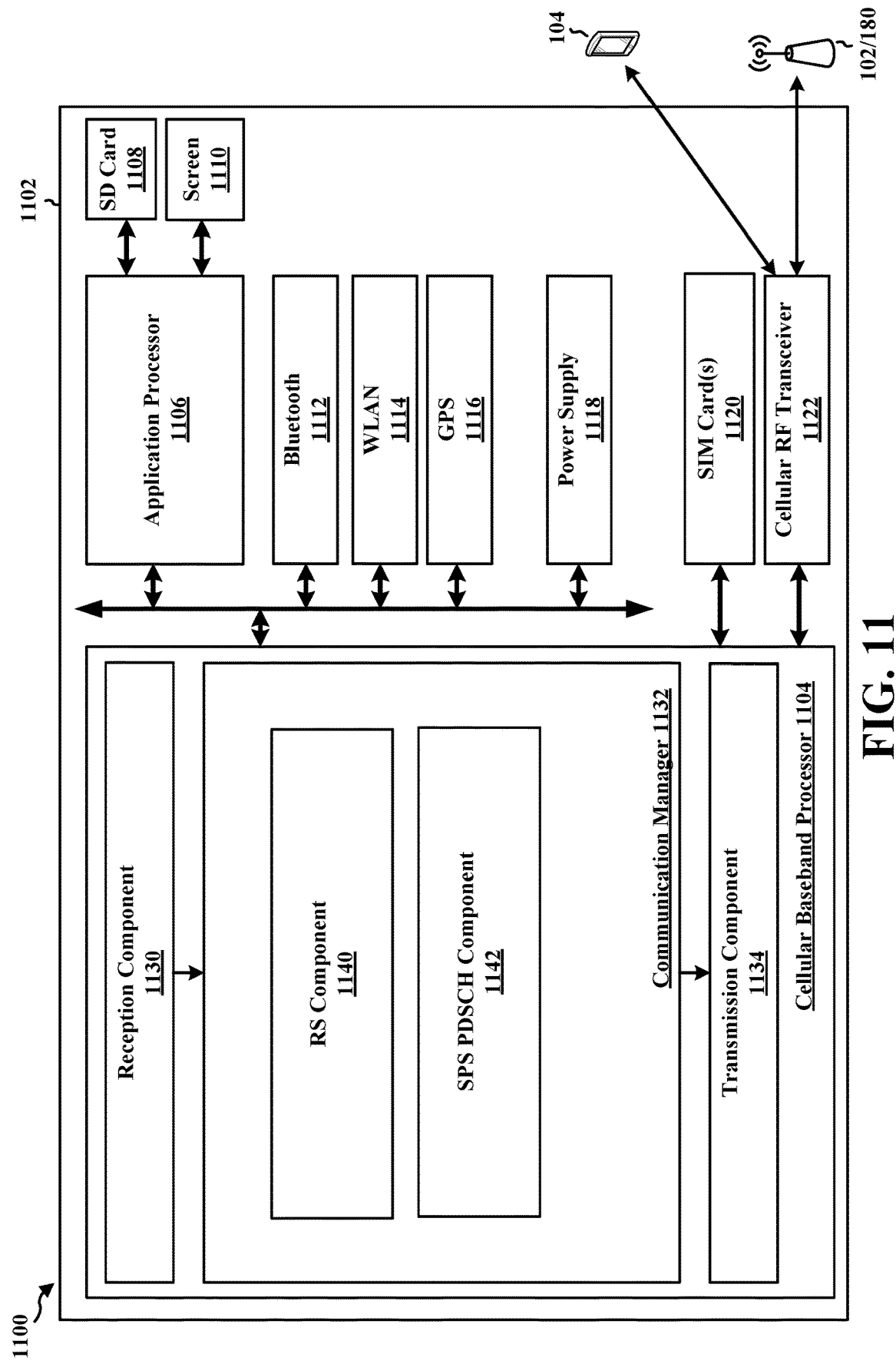
FIG. 11 is a diagram illustrating an example of a hardware implementation for an example apparatus.

FIG. 11 is a diagram 1100 illustrating an example of a hardware implementation for an apparatus 1102. The apparatus 1102 may be a UE, a component of a UE, or may implement UE functionality. In some aspects, the apparatus 1102 may include a cellular baseband processor 1104 (also referred to as a modem) coupled to a cellular RF transceiver 1122. In some aspects, the apparatus 1102 may further include one or more subscriber identity modules (SIM) cards 1120, an application processor 1106 coupled to a secure digital (SD) card 1108 and a screen 1110, a Bluetooth module 1112, a wireless local area network (WLAN) module 1114, a Global Positioning System (GPS) module 1116, or a power supply 1118. The cellular baseband processor 1104 communicates through the cellular RF transceiver 1122 with the UE 104 and/or BS 102/180. The cellular baseband processor 1104 may include a computer-readable medium/memory. The computer-readable medium/memory may be non-transitory. The cellular baseband processor 1104 is responsible for general processing, including the execution of software stored on the computer-readable medium/memory. The software, when executed by the cellular baseband processor 1104, causes the cellular baseband processor 1104 to perform the various functions described supra. The computer-readable medium/memory may also be used for storing data that is manipulated by the cellular baseband processor 1104 when executing software. The cellular baseband processor 1104 further includes a reception component 1130, a communication manager 1132, and a transmission component 1134. The communication manager 1132 includes the one or more illustrated components. The components within the communication manager 1132 may be stored in the computer-readable medium/memory and/or configured as hardware within the cellular baseband processor 1104. The cellular baseband processor 1104 may be a component of the UE 350 and may include the memory 360 and/or at least one of the TX processor 368, the RX processor 356, and the controller/processor 359. In one configuration, the apparatus 1102 may be a modem chip and include just the baseband processor 1104, and in another configuration, the apparatus 1102 may be the entire UE (e.g., see 350 of FIG. 3) and include the additional modules of the apparatus 1102.

The communication manager 1132 includes an RS component 1140 that is configured to receive the activation signal or a deactivation signal of the new RS indicating that the corresponding PDSCH is the skipped SPS PDSCH occasion, receive the configuration of the new RS from the base station, receive the first PDSCH including the first RS, detect the first RS within the first PDSCH instance among the plurality of semi-persistent scheduled PDSCH occasions, and receive the second RS and the PDSCH signal within the second PDSCH occasion among the plurality of semi-persistent scheduled PDSCH occasions, e.g., as described in connection with 702, 704, 710, 712, 716, and 812. The communication manager 1132 further includes an SPS PDSCH component 1142 that is configured to receive the first PDSCH including the first RS, identify that no PDSCH signal is within the first PDSCH occasion from the base station based on the first RS within the first PDSCH occasion, and receive the second RS and the PDSCH signal within the second PDSCH occasion among the plurality of semi-persistent scheduled PDSCH occasions, e.g., as described in connection with 710, 714, 716, and 814.

The apparatus may include additional components that perform each of the blocks of the algorithm in the flowcharts of FIGS. 6, 7, and 8. As such, each block in the flowcharts of FIGS. 6, 7, and 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1102 may include a variety of components configured for various functions. In one configuration, the apparatus 1102, and in particular the cellular baseband processor 1104, includes means for detecting, from a base station, a first RS within a first PDSCH occasion among a plurality of semi-persistent scheduled PDSCH occasions, and means for identifying that no PDSCH signal is within the first PDSCH occasion from the base station based on the first RS within the first PDSCH occasion. The apparatus 1102 includes the means for receiving, from the base station, a second RS and a PDSCH signal within a second PDSCH occasion among the plurality of semi-persistent scheduled PDSCH occasions, the second RS indicating that the PDSCH signal is within the second PDSCH occasion, and means for receiving, from the base station, a first configuration of the first RS within the first PDSCH occasion, where the UE identifies that a PDSCH signal is not received within the first PDSCH occasion based on the first configuration of the first RS within the first PDSCH occasion. The means may be one or more of the components of the apparatus 1102 configured to perform the functions recited by the means. As described supra, the apparatus 1102 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 12:
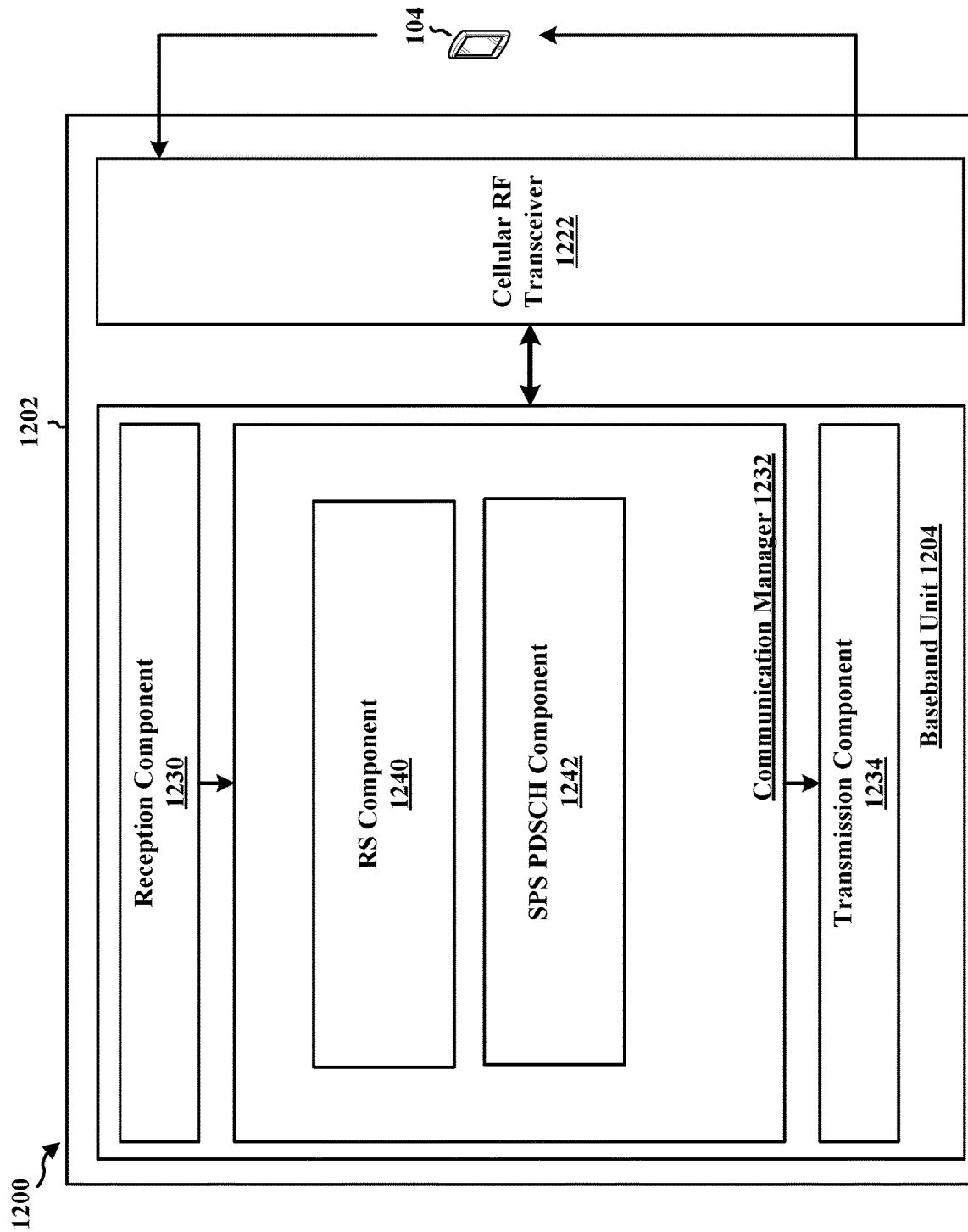
FIG. 12 is a diagram illustrating an example of a hardware implementation for an example apparatus.

FIG. 12 is a diagram 1200 illustrating an example of a hardware implementation for an apparatus 1202. The apparatus 1202 may be a base station, a component of a base station, or may implement base station functionality. In some aspects, the apparatus 1102 may include a baseband unit 1204. The baseband unit 1204 may communicate through a cellular RF transceiver 1222 with the UE 104. The baseband unit 1204 may include a computer-readable medium/memory. The baseband unit 1204 is responsible for general processing, including the execution of software stored on the computer-readable medium/memory. The software, when executed by the baseband unit 1204, causes the baseband unit 1204 to perform the various functions described supra. The computer-readable medium/memory may also be used for storing data that is manipulated by the baseband unit 1204 when executing software. The baseband unit 1204 further includes a reception component 1230, a communication manager 1232, and a transmission component 1234. The communication manager 1232 includes the one or more illustrated components. The components within the communication manager 1232 may be stored in the computer-readable medium/memory and/or configured as hardware within the baseband unit 1204. The baseband unit 1204 may be a component of the base station 310 and may include the memory 376 and/or at least one of the TX processor 316, the RX processor 370, and the controller/processor 375.

The communication manager 1232 includes an RS component 1240 that is configured to transmit an activation signal or a deactivation signal of the new RS indicating that the corresponding PDSCH is the skipped SPS PDSCH occasion, transmit a configuration of the new RS to the UE, generate the first RS based on identifying that no PDSCH signal is within the first PDSCH occasion, transmit the first RS within the first PDSCH, and transmit a second RS and a PDSCH signal within a second PDSCH occasion among the plurality of semi-persistent scheduled PDSCH occasions, e.g., as described in connection with 902, 904, 908, 910, and 916. The communication manager 1232 further includes an SPS PDSCH component 1242 that is configured to identify that no PDSCH signal is within a first PDSCH occasion among a plurality of semi-persistent scheduled PDSCH occasions transmitted to the UE, transmit the first RS within the first PDSCH, and transmit a second RS and a PDSCH signal within a second PDSCH occasion among the plurality of semi-persistent scheduled PDSCH occasions, e.g., as described in connection with 906, 910, 916, 1006, and 1010.

The apparatus may include additional components that perform each of the blocks of the algorithm in the flowcharts of FIGS. 6, 9, and 10. As such, each block in the flowcharts of FIGS. 6, 9, and 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1202 may include a variety of components configured for various functions. In one configuration, the apparatus 1202, and in particular the baseband unit 1204, includes means for identifying that no PDSCH signal is within a first PDSCH occasion among a plurality of semi-persistent scheduled PDSCH occasions transmitted to a user equipment (UE), and means for transmitting, to the UE, a first RS within the first PDSCH, the first RS indicating that no PDSCH signal is within the first PDSCH occasion. The apparatus 1202 includes the means for transmitting, to the UE, a first configuration of the first RS within the first PDSCH occasion, means for generating the first RS based on identifying that no PDSCH signal is within the first PDSCH occasion, and means for transmitting, to the UE, a second RS and a PDSCH signal within a second PDSCH occasion among the plurality of semi-persistent scheduled PDSCH occasions, the second RS indicating that the PDSCH signal is within the second PDSCH occasion. The means may be one or more of the components of the apparatus 1202 configured to perform the functions recited by the means. As described supra, the apparatus 1202 may include the TX Processor 316, the RX Processor 370, and the controller/processor 375. As such, in one configuration, the means may be the TX Processor 316, the RX Processor 370, and the controller/processor 375 configured to perform the functions recited by the means.

The apparatus may include a base station and a UE. The base station may configure a new DM-RS to indicate a skipped SPS PDSCH occasion to the UE, and the UE may detect a DTX in the skipped SPS PDSCH occasion based on receiving the new DM-RS within the corresponding PDSCH occasion. The UE may detect that the corresponding PDSCH occasion is a skipped SPS PDSCH occasion by measuring the energy of the PDSCH signal symbols to detect that the PDSCH signal symbols do not include data signal. The UE may measure the DM-RS energy or detect the configuration of the DM-RS to determine that the second PDSCH does not include a PDSCH signal.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication including at least one processor coupled to a memory and configured to detect, from a base station, a first RS within a first PDSCH occasion among a plurality of semi-persistent scheduled PDSCH occasions, and identify that no PDSCH signal is within the first PDSCH occasion from the base station based on the first RS within the first PDSCH occasion.

Aspect 2 is the apparatus of aspect 1, further including a transceiver coupled to the at least one processor, where the first RS includes a DM-RS.

Aspect 3 is the apparatus of any of aspects 1 and 2, where the at least one processor and the memory are further configured to receive, from the base station, a second RS and a PDSCH signal within a second PDSCH occasion among the plurality of semi-persistent scheduled PDSCH occasions, the second RS indicating that the PDSCH signal is within the second PDSCH occasion, where at least one first configuration of the first RS is different from at least one second configuration of the second RS.

Aspect 4 is the apparatus of aspect 3, where the at least one first configuration includes a first time location of the first RS and the at least one second configuration includes a second time location of the first RS, and where the first time location of the first RS is different from the second time location of the second RS.

Aspect 5 is the apparatus of any of aspects 3 and 4, where the at least one first configuration includes an RS pattern indicating a set of RS resources allocated in a time-frequency domain, and where a first RS pattern of the first RS is configured with a first number of RS resources and a second RS pattern of the second RS is configured with a second number of RS resources, the first number of RS resources being smaller than the second number of RS resources.

Aspect 6 is the apparatus of aspect 5, where the first RS pattern includes a first comb pattern with a first comb offset in a frequency domain and the second RS pattern includes a second comb pattern with a second comb offset in the frequency domain, and where the first comb offset is greater than the second comb offset.

Aspect 7 is the apparatus of any of aspects 5 and 6, where the first RS pattern includes a first comb pattern with a first comb level and the second RS pattern includes a second comb pattern with a second comb level, and where the first comb level is greater than the second comb level.

Aspect 8 is the apparatus of any of aspects 3 to 7, where the at least one first configuration includes a number of RS ports, and where a first number of RS ports of the first RS is configured to be different from a second number of RS ports of the second RS.

Aspect 9 is the apparatus of any of aspects 3 to 8, where the at least one first configuration includes a scrambling sequence of RS, and where a first scrambling sequence of the first RS is configured to be different from a second scrambling sequence of the second RS.

Aspect 10 is the apparatus of any of aspects 3 to 9, where the first RS is generated by down-sampling the second RS or puncturing a pattern of the second RS.

Aspect 11 is the apparatus of any of aspects 3 to 10 where the first RS includes a first transmission power boosted equal to a second transmission power of the second PDSCH occasion including the second RS and the PDSCH signal.

Aspect 12 is the apparatus of any of aspects 3 to 11, where a first sequence of the first RS is generated by flipping one or more elements of a second sequence of the second RS.

Aspect 13 is the apparatus of any of aspects 1 to 12, where the at least one processor and the memory are further configured to receive, from the base station, a first configuration of the first RS within the first PDSCH occasion, where the UE identifies that a PDSCH signal is not received within the first PDSCH occasion based on the first configuration of the first RS within the first PDSCH occasion.

Aspect 14 is the apparatus of aspect 13, where the first configuration is received via at least one of a RRC signal, a MAC-CE, or DCI, or where the first configuration is activated via the DCI.

Aspect 15 is a method of wireless communication for implementing any of aspects 1 to 14.

Aspect 16 is an apparatus for wireless communication including means for implementing any of aspects 1 to 14.

Aspect 17 is a computer-readable medium storing computer executable code, where the code when executed by a processor causes the processor to implement any of aspects 1 to 14.

Aspect 18 is an apparatus for wireless communication including at least one processor coupled to a memory and configured to identify that no PDSCH signal is within a first PDSCH occasion among a plurality of semi-persistent scheduled PDSCH occasions transmitted to a UE, and transmit, to the UE, a first RS within the first PDSCH, the first RS indicating that no PDSCH signal is within the first PDSCH occasion.

Aspect 19 is the apparatus of aspect 18, further including a transceiver coupled to the at least one processor, where the RS includes a DM-RS.

Aspect 20 is the apparatus of any of aspects 18 and 19, where the at least one processor and the memory are further configured to generate the first RS based on identifying that no PDSCH signal is within the first PDSCH occasion, and transmit, to the UE, a second RS and a PDSCH signal within a second PDSCH occasion among the plurality of semi-persistent scheduled PDSCH occasions, the second RS indicating that the PDSCH signal is within the second PDSCH occasion, where at least one first configuration of the first RS is different from at least one second configuration of the second RS.

Aspect 21 is the apparatus of aspect 19, where the at least one first configuration includes a first time location of the first RS and the at least one second configuration includes a second time location of the second RS, and where the first time location of the first RS is different from the second time location of the second RS.

Aspect 22 is the apparatus of any of aspects 20 and 21, where the at least one first configuration includes an RS pattern indicating a set of RS resources allocated in a time-frequency domain, and where a first RS pattern of the first RS is configured with a first number of RS resources and a second RS pattern of the second RS is configured with a second number of RS resources, the first number of RS resources being smaller than the second number of RS resources.

Aspect 23 is the apparatus of aspect 22, where the first RS pattern includes a first comb pattern with a first comb offset in a frequency domain and the second RS pattern includes a second comb pattern with a second comb offset in the frequency domain, and where the first comb offset is greater than the second comb offset.

Aspect 24 is the apparatus of any of aspects 22 and 23, where the first RS pattern includes a first comb pattern with a first comb level and the second RS pattern includes a second comb pattern with a second comb level, and where the first comb level is greater than the second comb level.

Aspect 25 is the apparatus of any of aspects 20 to 24, where the at least one first configuration includes a number of RS ports, and where a first number of RS ports of the first RS is configured to be different from a second number of RS ports of the second RS.

Aspect 26 is the apparatus of any of aspects 20 to 25, where the at least one first configuration includes a scrambling sequence of RS, and where a first scrambling sequence of the first RS is configured to be different from a second scrambling sequence of the second RS.

Aspect 27 is the apparatus of any of aspects 20 to 26, where the first RS is generated by down-sampling the second RS or puncturing a pattern of the second RS.

Aspect 28 is the apparatus of any of aspects 20 to 27, where the first RS includes a first transmission power boosted equal to a second transmission power of the second PDSCH occasion including the second RS and the PDSCH signal.

Aspect 29 is the apparatus of any of aspects 20 to 28, where a first sequence of the first RS is generated by flipping one or more elements of a second sequence of the second RS.

Aspect 30 is the apparatus of any of aspects 18 to 29, where the at least one processor and the memory are further configured to transmit, to the UE, a first configuration of the first RS within the first PDSCH occasion.

Aspect 31 is the apparatus of aspect 30, where the first configuration is transmitted via at least one of a RRC signal, a MAC-CE, or DCI, or where the first configuration is activated via the DCI.

Aspect 32 is a method of wireless communication for implementing any of aspects 18 to 31.

Aspect 33 is an apparatus for wireless communication including means for implementing any of aspects 18 to 31.

Aspect 34 is a computer-readable medium storing computer executable code, where the code when executed by a processor causes the processor to implement any of aspects 18 to 31.

What is claimed is:
1. An apparatus for wireless communication at a user equipment (UE), comprising:
  memory; and
  at least one processor coupled to the memory and configured to:
    detect, from a base station, a first reference signal (RS) within a first physical downlink shared channel

(PDSCH) occasion among a plurality of semi-persistent scheduled PDSCH occasions; and identify that no PDSCH signal is within the first PDSCH occasion from the base station based on a difference between a first energy level associated with the first RS within the first PDSCH occasion and a second energy level associated with a portion of the first PDSCH occasion not including the first RS.

2. The apparatus of claim 1, further comprising a transceiver coupled to the at least one processor, wherein the first RS includes a demodulation reference signal (DM-RS).

3. The apparatus of claim 1, wherein the at least one processor and the memory are further configured to:

receive, from the base station, a second RS and a PDSCH signal within a second PDSCH occasion among the plurality of semi-persistent scheduled PDSCH occasions, the second RS indicating that the PDSCH signal is within the second PDSCH occasion, wherein at least one first configuration of the first RS is different from at least one second configuration of the second RS.

4. The apparatus of claim 3, wherein the at least one first configuration includes a first time location of the first RS and the at least one second configuration includes a second time location of the second RS, and wherein the first time location of the first RS is different from the second time location of the second RS.

5. The apparatus of claim 3, wherein the at least one first configuration includes an RS pattern indicating a set of RS resources allocated in a time-frequency domain, and wherein a first RS pattern of the first RS is configured with a first number of RS resources and a second RS pattern of the second RS is configured with a second number of RS resources, the first number of RS resources being smaller than the second number of RS resources.

6. The apparatus of claim 5, wherein the first RS pattern includes a first comb pattern with a first comb offset in a frequency domain and the second RS pattern includes a second comb pattern with a second comb offset in the frequency domain, and wherein the first comb offset is greater than the second comb offset.

7. The apparatus of claim 5, wherein the first RS pattern includes a first comb pattern with a first comb level and the second RS pattern includes a second comb pattern with a second comb level, and wherein the first comb level is greater than the second comb level.

8. The apparatus of claim 3, wherein the at least one first configuration includes a number of RS ports, and wherein a first number of RS ports of the first RS is configured to be different from a second number of RS ports of the second RS.

9. The apparatus of claim 3, wherein the at least one first configuration includes a scrambling sequence of RS, and wherein a first scrambling sequence of the first RS is configured to be different from a second scrambling sequence of the second RS.

10. The apparatus of claim 3, wherein the first RS is generated by down-sampling the second RS or puncturing a pattern of the second RS.

11. The apparatus of claim 3, wherein the first RS includes a first transmission power boosted equal to a second transmission power of the second PDSCH occasion including the second RS and the PDSCH signal.

12. The apparatus of claim 3, wherein a first sequence of the first RS is generated by flipping one or more elements of a second sequence of the second RS.

13. The apparatus of claim 1, wherein the at least one processor and the memory are further configured to:

receive, from the base station, a first configuration of the first RS within the first PDSCH occasion, wherein the UE identifies that a PDSCH signal is not received within the first PDSCH occasion based on the first configuration of the first RS within the first PDSCH occasion.

14. The apparatus of claim 13, wherein to receive the first configuration, the at least one processor and the memory are configured to receive the first configuration via at least one of a radio resource control (RRC) signal, a medium access control (MAC) control element (CE) (MAC-CE), or downlink control information (DCI), or wherein the first configuration is activated via the DCI.

15. An apparatus for wireless communication at a base station, comprising:

memory; and at least one processor coupled to the memory and configured to:

schedule a plurality of semi-persistent physical downlink shared channel (PDSCH) occasions for a user equipment (UE); and transmit, to the UE, a first reference signal (RS) within a first PDSCH occasion of the plurality of semi-persistent scheduled PDSCH occasions, wherein a first energy level associated with the first RS within the first PDSCH occasion is different from a second energy level associated with a portion of the first PDSCH occasion not including the first RS, and wherein the first PDSCH includes no PDSCH signal.

16. The apparatus of claim 15, further comprising a transceiver coupled to the at least one processor, wherein the RS includes a demodulation reference signal (DM-RS).

17. The apparatus of claim 15, wherein the at least one processor and the memory are further configured to:

generate the first RS based on identifying that no PDSCH signal is within the first PDSCH occasion; and transmit, to the UE, a second RS and a PDSCH signal within a second PDSCH occasion among the plurality of semi-persistent scheduled PDSCH occasions, the second RS indicating that the PDSCH signal is within the second PDSCH occasion, wherein at least one first configuration of the first RS is different from at least one second configuration of the second RS.

18. The apparatus of claim 17, wherein the at least one first configuration includes a first time location of the first RS and the at least one second configuration includes a second time location of the second RS, and wherein the first time location of the first RS is different from the second time location of the second RS.

19. The apparatus of claim 17, wherein the at least one first configuration includes an RS pattern indicating a set of RS resources allocated in a time-frequency domain, and wherein a first RS pattern of the first RS is configured with a first number of RS resources and a second RS pattern of the second RS is configured with a second number of RS resources, the first number of RS resources being smaller than the second number of RS resources.

20. The apparatus of claim 19, wherein the first RS pattern includes a first comb pattern with a first comb offset in a frequency domain and the second RS pattern includes a second comb pattern with a second comb offset in the frequency domain, and wherein the first comb offset is greater than the second comb offset.

21. The apparatus of claim 19, wherein the first RS pattern includes a first comb pattern with a first comb level and the second RS pattern includes a second comb pattern with a second comb level, and wherein the first comb level is greater than the second comb level.

22. The apparatus of claim 17, wherein the at least one first configuration includes a number of RS ports, and wherein a first number of RS ports of the first RS is configured to be different from a second number of RS ports of the second RS.

23. The apparatus of claim 17, wherein the at least one first configuration includes a scrambling sequence of RS, and wherein a first scrambling sequence of the first RS is configured to be different from a second scrambling sequence of the second RS.

24. The apparatus of claim 17, wherein the first RS is generated by down-sampling the second RS or puncturing a pattern of the second RS.

25. The apparatus of claim 17, wherein the first RS includes a first transmission power boosted equal to a second transmission power of the second PDSCH occasion including the second RS and the PDSCH signal.

26. The apparatus of claim 17, wherein a first sequence of the first RS is generated by flipping one or more elements of a second sequence of the second RS.

27. The apparatus of claim 15, wherein the at least one processor and the memory are further configured to: transmit, to the UE, a first configuration of the first RS within the first PDSCH occasion.

28. The apparatus of claim 27, wherein to transmit the first configuration, the at least one processor and the memory are configured to transmit the first configuration via at least one of a radio resource control (RRC) signal, a medium access control (MAC) control element (CE) (MAC-CE), or downlink control information (DCI), or wherein the first configuration is activated via the DCI.

29. A method of wireless communication performed by a user equipment (UE), comprising:

detecting, from a base station, a first reference signal (RS) within a first physical downlink shared channel (PDSCH) instance among a plurality of semi-persistent scheduled PDSCH occasions; and identifying that no PDSCH signal is within the first PDSCH occasion from the base station based on a difference between a first energy level associated with the first RS within the first PDSCH occasion and a second energy level associated with a portion of the first PDSCH occasion not including the first RS.

30. A method of wireless communication performed by a base station, comprising:

scheduling a plurality of semi-persistent physical downlink shared channel (PDSCH) occasions for a user equipment (UE); and transmitting, to the UE, a first reference signal (RS) within a first PDSCH occasion of the plurality of semi-persistent scheduled PDSCH occasions, wherein a first energy level associated with the first RS within the first PDSCH occasion is different from a second energy level associated with a portion of the first PDSCH occasion not including the first RS, and wherein the first PDSCH includes no PDSCH signal.

* * * * *